(12) United States Patent
Hara et al.

(10) Patent No.: US 9,908,306 B2
(45) Date of Patent: Mar. 6, 2018

(54) INFRARED SHIELDING SHEET, METHOD FOR MANUFACTURING THE SAME, AND USE OF THE SAME

(71) Applicant: Nippon Kayaku KabushikiKaisha, Tokyo (JP)

(72) Inventors: Yukihiro Hara, Tokyo (JP); Michiharu Arifuku, Tokyo (JP); Shoko Saito, Tokyo (JP); Myeongjin Kang, Tokyo (JP); Noriko Kiyoyanagi, Tokyo (JP)

(73) Assignee: Nippon Kayaku KabushikiKaisha, Tokyo (JP)

(*) Notice: Subject to any disclaimer, the term of this patent is extended or adjusted under 35 U.S.C. 154(b) by 0 days.

(21) Appl. No.: 14/890,434

(22) PCT Filed: May 16, 2014

(86) PCT No.: PCT/JP2014/063064
§ 371 (c)(1),
(2) Date: Nov. 11, 2015

(87) PCT Pub. No.: WO2014/185518
PCT Pub. Date: Nov. 20, 2014

(65) Prior Publication Data
US 2016/0082697 A1      Mar. 24, 2016

(30) Foreign Application Priority Data

May 16, 2013   (JP) .................................. 2013-104324
Dec. 27, 2013  (JP) .................................. 2013-272893

(51) Int. Cl.
*B32B 7/02*      (2006.01)
*B32B 17/10*     (2006.01)
(Continued)

(52) U.S. Cl.
CPC ............ *B32B 7/02* (2013.01); *B32B 17/1055* (2013.01); *B32B 17/10633* (2013.01);
(Continued)

(58) Field of Classification Search
None
See application file for complete search history.

(56) References Cited

U.S. PATENT DOCUMENTS 5,518,810 A    5/1996  Nishihara et al.
7,629,040 B2  12/2009  Yaoita et al.
(Continued)

FOREIGN PATENT DOCUMENTS

EP    2597495 A1    5/2013
EP    2767396 A1    8/2014
(Continued)

OTHER PUBLICATIONS

International Search Report dated Aug. 26, 2014 in corresponding PCT application No. PCT/JP2014/063064.
(Continued)

*Primary Examiner* — Tahseen N Khan
(74) *Attorney, Agent, or Firm* — Nields, Lemack & Frame, LLC

(57) ABSTRACT

An infrared shielding sheet includes a laminated film formed by alternately laminating a high refractive index resin layer containing fine particles and a low refractive index resin layer containing fine particles. At least one of the low refractive index resin layers has a value of 0.1 or more that is obtained by subtracting a refractive index at an arbitrary wavelength from 780 to 2500 nm from a refractive index at a wavelength of 550 nm. The low refractive index resin layer has a refractive index lower than a refractive index of the high refractive index resin layer at any wavelength in a range from 550 nm to the arbitrary wavelength inclusive.

21 Claims, 7 Drawing Sheets

(51) Int. Cl.
*G02B 5/22* (2006.01)
*G02B 5/26* (2006.01)
*G02B 5/28* (2006.01)
*C03C 17/34* (2006.01)
*C08J 7/04* (2006.01)

(52) U.S. Cl.
CPC ............... *C03C 17/34* (2013.01); *C08J 7/042* (2013.01); *G02B 5/22* (2013.01); *G02B 5/26* (2013.01); *G02B 5/28* (2013.01); *B32B 2264/10* (2013.01); *B32B 2264/102* (2013.01); *B32B 2305/028* (2013.01); *B32B 2605/006* (2013.01); *C03C 2217/445* (2013.01); *C03C 2217/475* (2013.01); *C08J 2367/02* (2013.01); *C08J 2433/00* (2013.01)

(56) References Cited

U.S. PATENT DOCUMENTS

| | | | |
|---|---|---|---|
| 7,638,184 | B2 | 12/2009 | Yaoita et al. |
| 2007/0157668 | A1* | 7/2007 | Nadaud ................ C03C 23/006 65/60.1 |
| 2008/0206533 | A1* | 8/2008 | Yaoita ............... B32B 17/10036 428/216 |
| 2009/0239048 | A1* | 9/2009 | Sugihara ................ G02B 1/041 428/212 |
| 2011/0300356 | A1 | 12/2011 | Takamatsu et al. |
| 2013/0100523 | A1 | 4/2013 | Taima et al. |
| 2013/0114131 | A1* | 5/2013 | Suzuki .................. G02B 5/287 359/359 |
| 2014/0233092 | A1 | 8/2014 | Nojima |
| 2015/0132550 | A1 | 5/2015 | Kohno et al. |

FOREIGN PATENT DOCUMENTS

| | | |
|---|---|---|
| JP | 7-69632 A | 3/1995 |
| JP | 2002-220262 A | 8/2002 |
| JP | 2008-176143 A | 7/2008 |
| JP | 2010-202465 A | 9/2010 |
| JP | 2010-222233 A | 10/2010 |
| JP | 2012-093481 A | 5/2012 |
| WO | 2007/020791 A1 | 2/2007 |
| WO | 2012/014655 A1 | 2/2012 |
| WO | 2012/161096 A1 | 11/2012 |
| WO | 2013/054912 A1 | 4/2013 |

OTHER PUBLICATIONS

European communication dated Nov. 23, 2016 in corresponding European patent application No. 14797935.5.

* cited by examiner

INFRARED SHIELDING SHEET, METHOD FOR MANUFACTURING THE SAME, AND USE OF THE SAME

TECHNICAL FIELD

The present invention relates to a novel infrared shielding sheet effectively absorbing or reflecting infrared rays and having an excellent transparency and a low haze, and also relates to a method for manufacturing the infrared shielding sheet and a use thereof (e.g., for an interlayer film for glass, a laminated glass and a window member).

BACKGROUND ART

Lately, in terms of energy saving or global environment issues, reducing burden of air conditioning equipment is required. For example, in the fields of automobiles and house construction, it is required that the temperature in a room or a cabin of a vehicle is controlled by laying an infrared shielding material, which is capable of blocking the infrared rays of sunlight, on window glasses.

Various materials capable of blocking the infrared rays are known. Patent Document 1 discloses a high insulating laminated glass for reflecting rays of light at a specific wavelength in the infrared region. The insulating laminated glass is obtained by laminating, between at least two opposite glass substrates: an infrared reflecting film made of a multilayer film (dielectric multilayer film) where a high refractive index layer and a low refractive index layer are alternately laminated; and a functional laminated interlayer film (fine particle film) in which electroconductive ultrafine particles (such as antimony-doped tin oxide) for blocking the infrared rays are uniformly dispersed. In order to manufacture the high insulating laminated glass, the dielectric multilayer film and the fine particle film are needed to be formed separately, which causes a problem of manufacturing cost.

Patent Document 2 discloses a laminated glass for vehicle windows for reflecting rays of light at a specific wavelength in the infrared region. The laminated glass is obtained by laminating, between a first glass plate and a second glass plate: an laminated film (dielectric multilayer film) where a high refractive index inorganic material layer and a low refractive index inorganic material layer are alternately laminated; and an interlayer film (fine particle film) in which infrared shielding fine particles such as ITO (indium tin oxide) are dispersed and contained. In order to manufacture the laminated glass for vehicle windows, the dielectric multilayer film and the fine particle film are needed to be formed separately, which causes a problem of manufacturing cost.

Patent Document 3 discloses an insulating glass obtained by alternately laminating, on a glass substrate, a transparent conductive layer and a high refractive index layer. The high refractive layer has a relatively high refractive index in the infrared region compared with the refractive index of the transparent conductive layer. However, in the insulating glass, the layer composed of only conductor is used as the low refractive index layer in the infrared region. Thus, it cannot be used in any system of which radio wave transmissibility is required so as to transmit and receive, for example, signals of a mobile phone, a TV and a GPS (global positioning system) inside or outside the room. Furthermore, for the insulating glass, vacuum facilities for sputtering and the like are needed to form the layer composed of only the conductor, which causes a problem of manufacturing cost.

CITATION LIST

Patent Literature

[Patent Literature 1] JP 2002-220262 A
[Patent Literature 2] WO 2007/020791 Pamphlet
[Patent Literature 3] JP 2010-202465 A

SUMMERY OF INVENTION

Technical Problems

An object of the present invention is to provide a novel infrared shielding sheet having remarkably improved transparency in the visible light region, radio wave transmissibility, infrared shielding property, and manufacturing cost.

Solution to Problem

As a result of intensive studies to solve the above problems in the conventional art, it is found that a novel infrared shielding sheet having transparency and radio wave transmissibility can be realized, whose infrared shielding property and manufacturing cost are also remarkably improved. The novel infrared shielding sheet includes a laminated film formed by alternately laminating at least one high refractive index resin layer containing fine particles and at least one low refractive index resin layer containing fine particles, in which at least one of the at least one low refractive index resin layer has a value of 0.1 or more that is obtained by subtracting a refractive index at an arbitrary wavelength from 780 to 2500 nm from a refractive index at a wavelength of 550 nm, and in which the at least one low refractive index resin layer has a refractive index lower than a refractive index of the at least one high refractive index resin layer at any wavelength in a range from 550 nm to the arbitrary wavelength inclusive. Thus, the present invention is completed.

That is, the infrared shielding sheet of the present invention including a laminated film formed by alternately laminating at least one high refractive index resin layer containing fine particles and at least one low refractive index resin layer containing fine particles is characterized in that: at least one of the at least one low refractive index resin layers has a value of 0.1 or more that is obtained by subtracting a refractive index at an arbitrary wavelength from 780 to 2500 nm from a refractive index at a wavelength of 550 nm; and the at least one low refractive index resin layer has a refractive index lower than a refractive index of the at least one high refractive index resin layer at any wavelength in the range from 550 nm to the arbitrary wavelength inclusive.

Advantageous Effects of Invention

The infrared shielding sheet of the present invention has a good absorption property and reflection property in a wide infrared region and is excellent in radio wave transmissibility, transparency, and manufacturing cost. Furthermore, the infrared shielding sheet of the present invention has a low haze. Thus, it is possible to remarkably improve the infrared shielding property. When the infrared shielding sheet of the present invention is laid on window glasses of a house or a vehicle, both reduction effects of heating cost in winter and temperature in summer can be improved.

DESCRIPTION OF EMBODIMENTS

Figure 1:
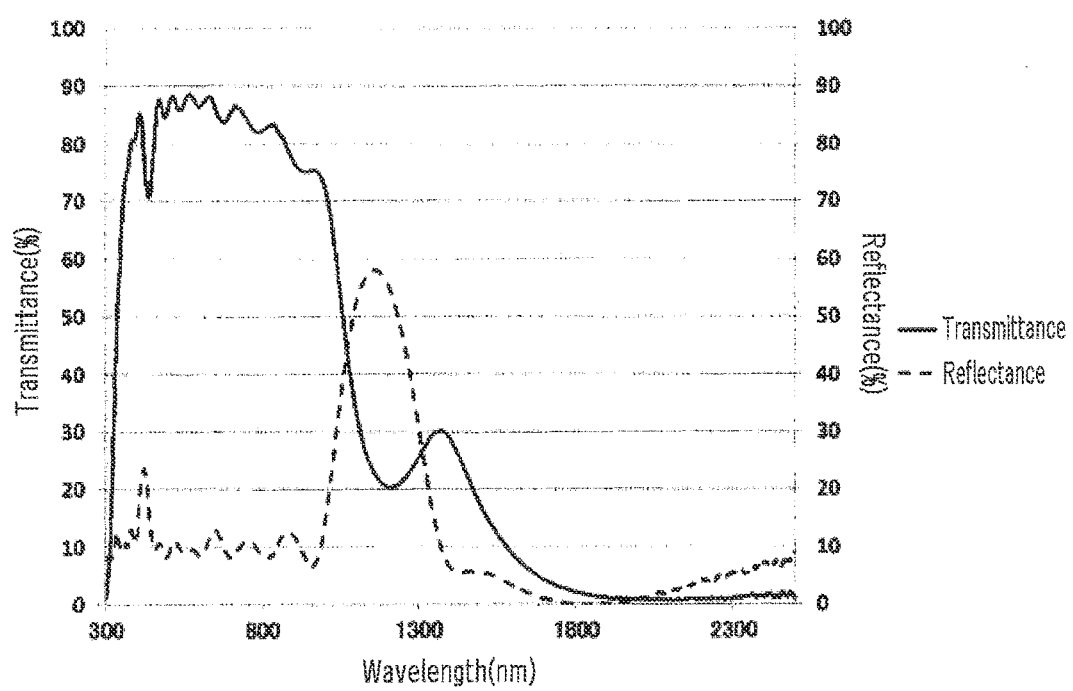
FIG. 1 is a graph showing the transmittance and the reflectance of an infrared shielding sheet according to Example 1 of the present invention plotted against wavelength.

The infrared shielding sheet of the present invention includes a laminated film formed by alternately laminating at least one high refractive index resin layer containing fine particles and at least one low refractive index resin layer containing fine particles. At least one of the at least one low refractive index resin layer has a value of 0.1 or more that is obtained by subtracting a refractive index at an arbitrary wavelength from 780 to 2500 nm from a refractive index at a wavelength of 550 nm. The at least one low refractive index resin layer has a refractive index lower than a refractive index of the at least one high refractive index resin layer at any wavelength in the range from 550 nm to the arbitrary wavelength inclusive. With the above configuration, since at least one of the at least one low refractive index resin layer has the value of 0.1 or more that is obtained by subtracting the refractive index at an arbitrary wavelength from 780 to 2500 nm from the refractive index at the wavelength of 550 nm, it is possible to reduce a difference in the refractive index between at least one of the at least one low refractive index resin layer and the high refractive index resin layer adjacent thereto at the wavelength of 550 nm, while increasing a difference in the refractive index between at least one of the at least one low refractive index resin layer and the high refractive index resin layer adjacent thereto at an arbitrary wavelength from 780 to 2500 nm. As a result, it is possible to realize an infrared shielding sheet having a good visible light transmittance and a good infrared shielding property. Also, with the above configuration, since the high refractive index layer containing the fine particles and the low refractive index layer containing the fine particles are both resin layers, it is possible to manufacture the laminated film easily by application method and the like, thereby to reduce the manufacturing cost. Furthermore, with the above configuration, since the high refractive index layer containing the fine particles and the low refractive index layer containing the fine particles are both resin layers, it is possible to realize an infrared shielding sheet having the radio wave transmissibility. Note that the term "infrared region" in the present application documents means the wavelength region from 780 to 2500 nm.

All of the at least one low refractive index resin layer may have a value of 0.1 or more that is obtained by subtracting the refractive index at an arbitrary wavelength from 780 to 1500 nm from the refractive index at the wavelength of 550 nm. Also, in the infrared shielding sheet of the present invention, the high refractive index resin layer may have a value of 0.1 or less that is obtained by subtracting the refractive index at an arbitrary wavelength from 780 to 1500 nm from the refractive index at the wavelength of 550 nm, and the low refractive index resin layer may have the value of 0.1 or more that is obtained by subtracting the refractive index at an arbitrary wavelength from 780 to 1500 nm from the refractive index at the wavelength of 550 nm. This makes it possible to reduce the difference in the refractive index between the low refractive index resin layer and the high refractive index resin layer at the wavelength of 550 nm, while further increasing the difference in the refractive index between the low refractive index resin layer and the high refractive index resin layer at an arbitrary wavelength from 780 to 1500 nm. As a result, it is possible to realize an infrared shielding sheet having better infrared shielding property while maintaining the good visible light transmittance.

Preferably, the infrared shielding sheet further includes a transparent support on which the laminated film is formed.

Figure 7:
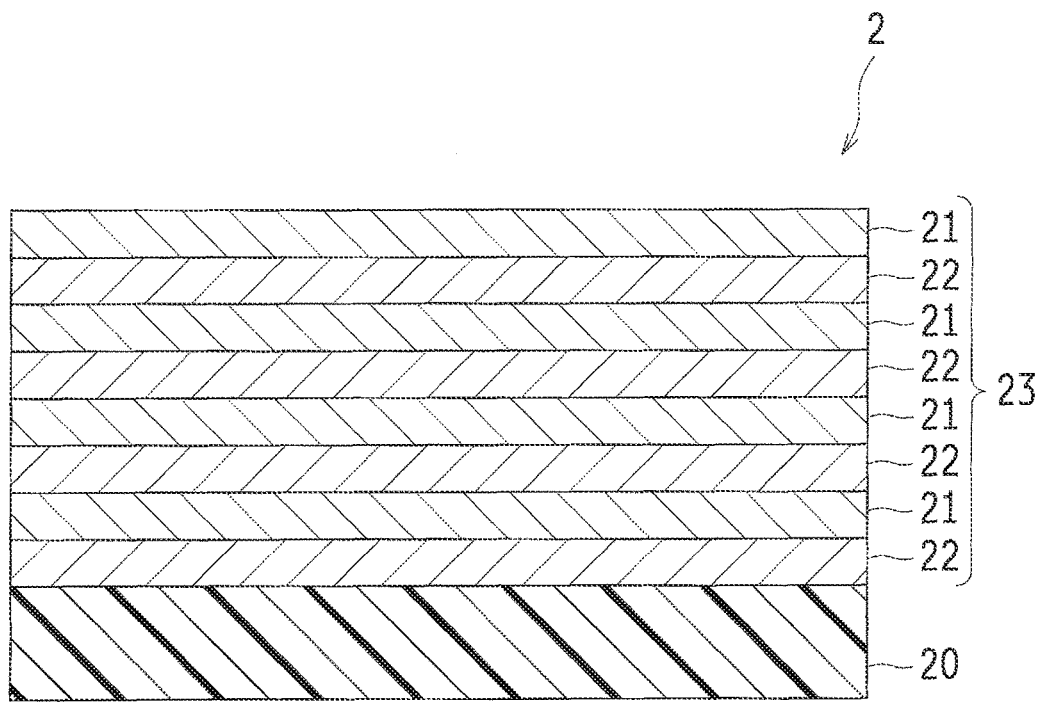
FIG. 7 is a cross-sectional view schematically showing an infrared shielding sheet according to one aspect of the present invention.

As shown in FIG. 7, the infrared shielding sheet according to one aspect of the present invention includes a laminated film 23 formed by alternately laminating a high refractive index resin layer 21 containing fine particles and a low refractive index resin layer 22 containing fine particles on a transparent support 20. In the aspect shown in FIG. 7, the total number of the high refractive index resin layers 21 and the low refractive index resin layers 22 is an even number (8), and the low refractive index resin layer 22 is the end layer on the side of transparent support 20 of the laminated film 23. However, the total number of the high refractive index resin layers 21 and the low refractive index resin layers 22 may be an odd number (e.g., 7), and the high refractive index resin layer 21 may be the end layer on the side of the transparent support 20 of the laminated film 23.

Various resin films, glasses and the like can be used as the transparent support. As the resin films, for example, the following can be used: a polyolefin film such as a polyethylene film and a polypropylene film; a polyester film such as a polyethylene terephthalate (hereinafter referred to as "PET") film, a polybutylene terephthalate film and a polyethylene naphthalate (hereinafter referred to as "PEN") film; a polycarbonate film; a polyvinyl chloride film; a cellulose triacetate film; a polyamide film; and a polyimide film.

In the infrared shielding sheet including the laminated film formed by alternately laminating the high refractive index resin layer and the low refractive index resin layer, the difference in the refractive index between the high refractive index resin layer and the low refractive index resin layer in the infrared region has an important role as well as an absolute value of the refractive index of the high refractive index resin layer, for determining the infrared reflecting function. That is, as the difference in the refractive index increases, and as the absolute value of the refractive index increases, the infrared reflecting function increases.

In the present invention, it is preferable that the difference in the refractive index between at least two layers adjacent to each other (the high refractive index resin layer and the low refractive index resin layer) is 0.1 or more at the wavelength (the wavelength arbitrarily set out of the infrared region from 780 to 2500 nm) of the infrared rays reflected by the laminated film. The above difference is more preferably 0.2 or more, still more preferably 0.3 or more, particularly preferably 0.35 or more.

When the difference in the refractive index of the two layers adjacent to each other is less than 0.1 at the wavelength of the infrared rays reflected by the laminated film, the number of layers should be increased to obtain a desirable infrared reflectance, which is undesirable due to reduction in the visible light transmittance and increase of the manufacturing cost.

Figure 3:
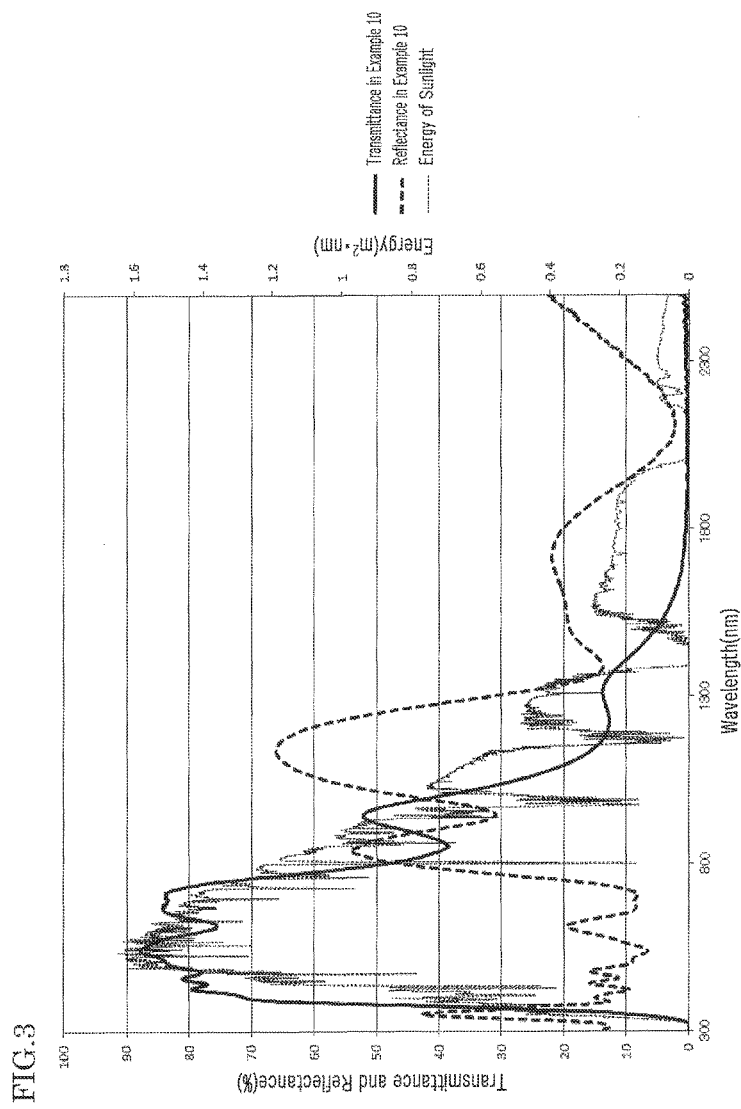
FIG. 3 is a graph showing the transmittance and the reflectance of an infrared shielding sheet according to Example 10 of the present invention, as well as showing energy of the sunlight reaching the surface of the earth plotted against wavelength.

Here, as shown in FIG. 3, there are some peaks of the energy in the infrared region of the sunlight that reaches the surface of the earth. Therefore, when blocking the infrared region of the sunlight is desired, it is important to block effectively the above peaks of the energy. As a result of intensive studies, it is found that the infrared region of the sunlight can be effectively blocked under the condition in which the optical thickness of at least one of the at least one high refractive index resin layer and the at least one low refractive index resin layer has the coefficient of the quarter wave optical thickness (hereinafter referred to as "QWOT") of 1.5 or more in an arbitrary wavelength from 780 to 2500 nm. Here, the coefficient of the QWOT related to the optical thickness is set to 1 when the equation nd=λ/4 is satisfied, where n represents the refractive index of the high refractive index resin layer or the low refractive index resin layer, d represents the geometric thickness of the high refractive index resin layer or the low refractive index resin layer, and λ represents the infrared wavelength (the wavelength arbitrarily set out of the infrared region from 780 to 2500 nm) reflected by the laminated film.

In the infrared shielding sheet of the present invention, it is preferable that the low refractive index resin layer has the refractive index lower than the refractive index of the high refractive index resin layer at an arbitrary wavelength from 780 to 2500 nm. Also, in the infrared shielding sheet of the present invention, it is preferable that the low refractive index resin layer has the refractive index lower than the refractive index of the high refractive index resin layer at an arbitrary wavelength from 780 to 2500 nm, and furthermore that at least one of the at least one high refractive index resin layer and/or at least one of the at least one low refractive index resin layer have/has the coefficient of the QWOT of 1.5 or more related to the optical thickness in an arbitrary wavelength from 780 to 2500 nm. This enables the peaks of the energy of the infrared region of the sunlight to be effectively reflected, thus the infrared rays can be efficiently blocked.

In the infrared shielding sheet having the above-described configuration, it is preferable that at least one of the at least one high refractive index resin layer and the at least one low refractive index resin layer, which are adjacent to the layer having the coefficient of the QWOT of 1.5 or more related to the optical thickness at the arbitrary wavelength, has the coefficient of the QWOT of 1 or more related to the optical thickness at the arbitrary wavelength. This makes it possible to efficiently block the infrared rays in the region of the infrared rays having the wavelengths (e.g., in the range from 780 nm to less than 1000 nm) shorter than the arbitrary wavelength. Also, it is preferable that the infrared shielding sheet having the above-described configuration includes: at least one high refractive index resin layer having the coefficient of the QWOT of 1 related to the optical thickness at the arbitrary wavelength; and at least one low refractive index resin layer having the coefficient of the QWOT of 1 related to the optical thickness at the arbitrary wavelength. This makes it possible to efficiently block the infrared rays having wavelengths in the vicinity of the arbitrary wavelength. Furthermore, in the infrared shielding sheet having the above-described configuration, it is preferable that the arbitrary wavelength is from 780 to 1500 nm. This makes it possible to efficiently block the infrared rays.

Regarding the layers other than the layer(s) whose coefficient of the QWOT related to the optical thickness is 1.5 or more out of the at least one high refractive index resin layer and the at least one low refractive index resin layer, the infrared wavelength λ thereof reflected by the laminated film is generally given by the equation (1) below:

$$n_H d_H + n_L d_L = \lambda/2 \qquad (1)$$

where $n_H$ and $d_H$ represent, respectively, the refractive index and the geometric thickness of the high refractive index resin layer, and $n_L$ and $d_L$ represent, respectively, the refractive index and the geometric thickness of the low refractive index resin layer.

The optical thickness (product of the refractive index $n_H$ and the geometric thickness $d_H$) of the high refractive index resin layer and the optical thickness (product of the refractive index $n_L$ and the geometric thickness $d_L$) of the low refractive index resin layer may be the same value that is the integral multiple of λ/4. Specifically, the optical thickness of each of the high refractive index resin layer and the low refractive index resin layer at the arbitrary wavelength from 780 to 1500 nm (e.g., the optical thickness at the wavelength of 1200 nm) may be in the range from 195 to 375 nm. This makes it possible to realize the infrared shielding sheet having a good visible light transmittance and a good infrared shielding property.

The infrared wavelength λ reflected by the laminated film may be in the range from 780 to 2500 nm, but more preferably, in the range from 780 to 1500 nm. When the infrared wavelength λ reflected by the laminated film is less than 780 nm, the infrared wavelength λ reflected by the laminated film is the wavelength in the visible light region. Thus, it is undesirable due to reduction in the visible light transmittance of the infrared shielding sheet. Also, when the infrared wavelength λ reflected by the laminated film exceeds 1500 nm, absorption by the fine particles contained in the low refractive index resin layer occurs, thus it is undesirable due to degradation of the infrared shielding effect.

In the infrared shielding sheet of the present invention, the total number of the at least one high refractive index resin layer and the at least one low refractive index resin layer (i.e., the number of the layers of the multilayer film) is preferably 3 or more, more preferably 4 or more. When the total number of the at least one high refractive index resin layer and the at least one low refractive index resin layer is less than 3, the infrared reflecting function is insufficient. When the total number of the at least one high refractive index resin layer and the at least one low refractive index resin layer is 3 or more, the total number of the at least one high refractive index resin layer and the at least one low refractive index resin layer is more preferably in the range from 3 to 30, and still more preferably in the range from 3 to 20, particularly preferably in the range from 3 to 15. Also, when the total number of the at least one high refractive index resin layer and the at least one low refractive index resin layer is 4 or more, the total number of the at least one high refractive index resin layer and the at least one low refractive index resin layer is more preferably in the range from 4 to 30, and still more preferably in the range from 4 to 20, particularly preferably in the range from 4 to 15. When the total number of the at least one high refractive index resin layer and the at least one low refractive index resin layer exceeds 30, it is undesirable due to increase of the manufacturing cost, reduction in the visible light transmittance, reduction in the durability and curl of the infrared shielding sheet caused by increase of stress of the multilayer film composed of the high refractive index resin layers and the low refractive index resin layers.

Regarding the optical performance, the infrared shielding sheet having a high visible light transmittance and a low total solar transmittance is ideal. However, in general, the visible light transmittance bears a proportional relationship with the solar transmittance. Thus, the optical performance is determined depending on which transmittance is considered to be important. Upon various studies, when the infrared shielding sheet of the present invention is laid on window glasses of a house or a vehicle, the visible light transmittance of the infrared shielding sheet of the present invention is preferably 50% or more, more preferably 70% or more, in order to minimize increase of the lighting cost inside the house or the vehicle and the heating cost in winter. The total solar transmittance of the infrared shielding sheet is preferably 80% or less, more preferably 75% or less, in order to effectively block the infrared rays. Furthermore, the haze of the infrared shielding sheet should not impair the transparency of the infrared shielding sheet, thus the haze is preferably 8% or less, more preferably 3% or less, still more preferably 1% or less.

When manufacturing the multilayer film using the difference in the refractive index between the high refractive index layer and the low refractive index layer by alternately laminating the high refractive index layer and the low refractive index layer by application method, the conventional art allows the high refractive index resin layer to contain dielectric fine particles (titanium oxide fine particles and the like) having a high refractive index, and the low refractive index resin layer to contain dielectric fine particles (silica fine particles and the like) having a low refractive index (for example, see Patent Document JP 2012-093481 A). The refractive index of the dielectric fine particles is substantially fixed from the visible light region to the infrared region, and the refractive index of the low refractive index resin layer is substantially fixed from the visible light region to the infrared region.

However, upon various studies, the low refractive index resin layer containing fine particles was found, which has a value of 0.1 or more that is obtained by subtracting the refractive index at an arbitrary wavelength from 780 to 2500 nm (particularly from 780 to 1500 nm) in the infrared region from the refractive index at the wavelength of 550 nm in the visible light region. Furthermore, since the low refractive index resin layer containing the fine particles also has the infrared absorbing function, it is found that the light in the infrared region can be blocked more efficiently than the conventional art by combining the low refractive index resin layer containing the fine particles with the high refractive index resin layer containing the fine particles (in particular, the high refractive index resin layer having a value of 0.1 or less that is obtained by subtracting the refractive index at an arbitrary wavelength from 780 to 1500 nm from the refractive index at the wavelength of 550 nm, e.g., the high refractive index resin layer containing the dielectric fine particles such as titanium oxide that is used in the conventional art).

For satisfying the above-described condition, the fine particles hardly absorbing the light in the visible light region and having a high refractive index in the infrared region is suitable for the fine particles contained in the high refractive index resin layer. Examples of the above fine particles include dielectric fine particles composed of the dielectrics such as titanium oxide, zirconium oxide, hafnium oxide, tantalum oxide, tungsten oxide, niobium oxide, cerium oxide, lead oxide, zinc oxide, diamond and the like. In particular, at least one kind of the dielectric fine particles selected from titanium oxide, zirconium oxide, zinc oxide and diamond are preferable. Other than the dielectric fine particles composed of the dielectrics as shown above, boride fine particles and nitride fine particles are exemplified as the electrically conductive metal oxide fine particles having high refractive index in the infrared region and having the infrared absorbing function. As the boride fine particles and the nitride fine particles, in particular, lanthanum hexaboride fine particles and titanium nitride fine particles are preferable. At least one layer of the at least one high refractive index resin layer preferably contains at least one kind of fine particles selected from the group consisting of titanium oxide, zirconium oxide, hafnium oxide, tantalum oxide, tungsten oxide, niobium oxide, cerium oxide, lead oxide, zinc oxide, diamond, boride and nitride.

The fine particles having a high refractive index in the infrared region may be used singularly or used in combination of two kinds or more. Furthermore, the different fine particles may be used relative to the respective high refractive index resin layers in the laminated film.

It is preferable that the fine particles contained in at least one of the at least one low refractive index resin layer hardly absorb the light in the visible light region, successfully absorb the light in the infrared region, and furthermore have a relatively low refractive index compared with the refractive index of the fine particles contained in the high refractive index resin layer. Examples of the above fine particles include electrically conductive metal oxide fine particles that have a plasma wavelength in the infrared region. As the metal oxide fine particles, in particular, metal oxide fine particles of tin oxide, indium oxide, zinc oxide, tungsten oxide, chromium oxide, molybdenum oxide and the like are exemplified. Out of the above, at least one kind of fine particles selected from the group consisting of at least one of tin oxide, indium oxide, zinc oxide and tungsten oxide is preferable because such fine particles hardly absorb the light in the visible light region. In particular, the indium oxide fine particles are still more preferable.

Also, in order to improve the electrical conduction property of the metal oxide fine particles, it is preferable that the metal oxide fine particles are doped with a third component (third element, i.e., dopant). As the dopant with which the tin oxide fine particles are doped, antimony (Sb), vanadium (V), niobium (Nb), tantalum (Ta) and the like are exemplified. As the dopant with which the indium oxide fine particles are doped, zinc (Zn), aluminum (Al), tin (Sn), antimony, gallium (Ga), germanium (Ge) and the like are exemplified. As the dopant with which the zinc oxide fine particles are doped, aluminum, gallium, indium (In), tin, antimony, niobium and the like are exemplified. As the dopant with which the tungsten oxide fine particles are doped, cesium (Cs), rubidium (Rb), potassium (K), thallium (Tl), indium, barium (Ba), lithium (Li), calcium (Ca), strontium (Sr), iron (Fe), tin, aluminum, copper (Cu) and the like are exemplified. In order to improve the electrical conduction property of the metal oxide fine particles, it is also preferable that the third component is replaced by an oxygen defect. That is, the metal oxide fine particles may have the oxygen defect. Examples of the metal oxide fine particles made of tungsten oxide fine particles having the oxygen defect include oxygen defect tungsten oxide particles (oxygen-deficient tungsten oxide particles) that are represented by the composition formula of WOx (where 2.45≤x≤2.999) and the like. Among the metal oxide fine particles that are doped with the third component or have the oxygen defect, it is preferable to use at least one kind of fine particles selected from the group consisting of antimony-doped tin oxide (ATO), tin-doped indium oxide (hereinafter occasionally referred to as "ITO"), gallium-doped zinc oxide (GZO), oxygen-deficient tungsten oxide, and cesium-doped tungsten oxide, and it is more preferable to use tin-doped indium oxide.

Also, when compressed under the pressure of 60 MPa, the above-described metal oxide fine particles preferably have the powder resistivity of 100 Ω·cm or less, more preferably have the powder resistivity of 10 Ω·cm or less, still more preferably have the powder resistivity of 1 Ω·cm. In case of using the fine particles having the powder resistivity higher than 100 Ω·cm when compressed under the pressure of 60 MPa, absorption due to plasma resonance of the fine particles occurs at the wavelength of more than 2500 nm, thus reducing the infrared shielding effect. Regarding the method for measuring the powder resistivity, it is preferable to use the powder resistivity measurement system MCP-PD51 (manufactured by Mitsubishi Chemical Analytech Co., Ltd.), however, the method is not limited thereto.

Also, when at least one of the at least one low refractive index resin layer contains non-hollow fine particles (solid fine particles), in particular, at least one kind of non-hollow fine particles selected from the group consisting of tin oxide, indium oxide, zinc oxide and tungsten oxide, at least one of the at least one low refractive index resin layer (which may be the same as or different from the layer containing the non-hollow fine particles) preferably contains hollow fine particles, more preferably contains hollow fine particles having the low refractive index (especially, the hollow fine particles having the refractive index lower than the refractive index of the non-hollow fine particles). This makes it possible to further improve the infrared shielding effect of the infrared shielding sheet.

As the hollow fine particles, it is possible to use known hollow fine particles such as hollow silica fine particles and hollow acrylic beads (hollow acrylic resin fine particles). As the non-hollow fine particles, it is preferable to use at least one kind of non-hollow fine particles selected from the group consisting of at least one of tin oxide, indium oxide, zinc oxide and tungsten oxide, and it is more preferable to use at least one kind of non-hollow fine particles selected from the group consisting of antimony-doped tin oxide, ITO, gallium-doped zinc oxide, oxygen-deficient tungsten oxide, and cesium-doped tungsten oxide.

It is preferable that the hollow fine particles have the porosity from 10 to 90 vol %. The hollow fine particles having the porosity less than 10 vol % reduce an effect decreasing the refractive index of the fine particles obtained by the hollows in the hollow fine particles, which also reduces an effect obtained by use of the hollow fine particles in the low refractive index resin layer. If the hollow fine particles have the porosity of more than 90 vol %, the mechanical strength of the hollow fine particles is decreased, which leads to an unfavorable result in which the hollow fine particles cannot maintain the hollows.

When the hollow fine particles are combined with the non-hollow fine particles such as the metal oxide non-hollow fine particles so as to be the fine particles contained in the low refractive index resin layer, the ratio of the non-hollow fine particles the fine particles contained in the low refractive index resin layer is preferably from 10 to 90 wt %, more preferably from 20 to 90 wt %. If the ratio of the non-hollow fine particles is less than 10 wt %, it is undesirable due to insufficient infrared absorbing function obtained by the non-hollow fine particles. Also, if the ratio of the non-hollow fine particles is more than 90 wt %, it is undesirable due to decrease of the ratio of the hollow fine particles.

When at least one of the at least one low refractive index resin layer contains the above-described electrically conductive metal oxide fine particles (hereinafter referred to as "electrically conductive fine particles", which are in particular at least one kind of fine particles selected from the group consisting of tin oxide, indium oxide, zinc oxide and tungsten oxide), at least one of the at least one low refractive index resin layer (which may be the same as or different from the layer containing the electrically conductive metal oxide fine particles) can contain dielectric fine particles having the low refractive index. As the dielectric fine particles, it is possible to use silica fine particles, magnesium fluoride fine particles and the like. Furthermore, as the dielectric fine particles, it is possible to use hollow dielectric fine particles. Examples of the hollow dielectric fine particles include the hollow dielectric fine particles such as hollow silica fine particles and hollow acrylic beads. When at least one of the at least one low refractive index resin layer contains the electrically conductive metal oxide fine particles (in particular, at least one kind of fine particles selected from the group consisting of tin oxide, indium oxide, zinc oxide and tungsten oxide), and in addition, when at least one of the at least one low refractive index resin layer (which may be the same as or different from the layer containing the electrically conductive metal oxide fine particles) contains the silica fine particles, in particular the hollow silica fine particles, the refractive index of the low refractive index resin layer is decreased, thus the infrared rays can be further effectively blocked.

When the electrically conductive fine particles are combined with the dielectric fine particles (in particular, the hollow dielectric fine particles) so as to be contained in the total of the at least one low refractive index resin layer, the ratio of the electrically conductive fine particles in the fine particles contained in the total of the at least one low refractive index resin layer is preferably from 10 to 90 wt %, more preferably from 20 to 90 wt %. If the ratio of the electrically conductive fine particles is less than 10 wt %, it is undesirable due to insufficient infrared absorbing function obtained by the metal oxide. Also, if the ratio of the electrically conductive fine particles is more than 90 wt %, it is undesirable due to decrease of the ratio of the dielectric fine particles (in particular, the hollow dielectric fine particles).

The fine particles (the electrically conductive fine particles, the dielectric fine particles, the hollow fine particles and the like) for the of the at least one low refractive index resin layer may be used singularly or used in combination of two kinds or more. When two or more kinds of fine particles are contained in the at least one low refractive index resin layer, the different kinds of fine particles may be contained in the respective low refractive index resin layers. Also, the different kinds of fine particles may be contained in the same low refractive index resin layer.

Furthermore, in the infrared shielding sheet of the present invention, the fine particles contained in the at least one high refractive index resin layer and the at least one low refractive index resin layer have preferably the average primary particle size or the average dispersed particle size of 300 nm or less, more preferably the average primary particle size or the average dispersed particle size from 1 nm to 200 nm. If the average primary particle size or the average dispersed particle size of the fine particles exceeds 300 nm, the infrared shielding sheet has a high haze, which results in a reduced visibility through the infrared shielding sheet. Note that the term "the average primary particle size of the fine particles" in the present specification means the average particle size of the fine particles before dispersion, and the term "the average dispersed particle size of the fine particles" means the average particle size of the fine particles in dispersion after the dispersion step. The average primary particle size is calculated based on the specific surface area measured by the BET (Brunauer-Emmett-Teller) method. The particle size distribution measurement apparatus for measuring the average dispersed particle size is not particularly limited, however, it is preferable to use "Nanotrac UPA-EX150" (manufactured by NIKKISO CO., LTD).

In order to satisfy the infrared shielding property, the smoothness, the low haze and the radio wave transmissibility of the infrared shielding sheet, it is important to adequately disperse the fine particles contained in the at least one high refractive index resin layer and the at least one low refractive index resin layer. In order to disperse the fine particles, the methods using the following are desirable: a sand mill, an attritor, a ball mill, a homogenizer, a roll mill, a bead mill and the like. Above all, the method using the bead mill is preferable. When the bead mill is used, preferably the bead mill has the peripheral speed from 3 to 10 m/s. If the peripheral speed of the bead mill is less than 3 m/s, the fine particles cannot be sufficiently dispersed. If the peripheral speed of the bead mill is more than 10 m/s, the surface of the fine particles (especially the electrically conductive fine particles) contained in particular in the at least one low refractive index resin layer is scratched, thereby the infrared absorbing function is reduced. The appropriate range of the dispersion energy slightly differs depending on, for example, the apparatus for dispersion, resin binders contained in the at least one high refractive index resin layer and the at least one low refractive index resin layer and the concentration of the fine particles during dispersion. However, it is preferable to disperse the fine particles with a relatively low dispersion energy. Furthermore, if coarse particles remain after the dispersion of the fine particles, it is preferable that the coarse particles are removed by further treatments such as filtration and centrifugation.

The high refractive index resin layer and the low refractive index resin layer can be formed by: applying a dispersion liquid, which is obtained by dissolving a resin binder and dispersing the fine particles in a solvent, to a surface of a body such as the transparent support; and then vaporizing the solvent. The solvent used for dispersion of the fine particles in the dispersion liquid is not particularly limited. For example, it is possible to use water, an organic solvent, or a mixture of water and an organic solvent. Examples of the above organic solvents include: a hydrocarbon solvent (toluene, xylene, n-hexane, cyclohexane, n-heptane and the like); an alcohol solvent (methanol, ethanol, isopropyl alcohol, butanol, t-butanol, benzyl alcohol and the like); a ketone solvent (acetone, methyl ethyl ketone, methyl isobutyl ketone, diisobutyl ketone, cyclohexanone, acetylacetone and the like); an ester solvent (ethyl acetate, methyl acetate, butyl acetate, cellosolve acetate, amyl acetate and the like); an ether solvent (isopropyl ether, 1,4-dioxane and the like); a glycol solvent (ethylene glycol, diethylene glycol, triethylene glycol, propylene glycol and the like); a glycol ether solvent (methyl cellosolve, butyl cellosolve, diethylene glycol monomethyl ether, propylene glycol monomethyl ether and the like); a glycol ester solvent (ethylene glycol monomethyl ether acetate, propylene glycol monomethyl ether acetate, diethylene glycol monoethyl ether acetate and the like); a glyme solvent (monoglyme, diglyme and the like); a halogen solvent (dichloromethane, chloroform and the like); an amide solvent (N,N-dimethylformamide, N,N-dimethylacetamide, N-methyl-2-pyrrolidone and the like); pyridine; tetrahydrofuran; sulfolane; acetonitrile; and dimethyl sulfoxide. The solvent used for dispersion is preferably at least one kind of the solvents selected from the group consisting of the water, the ketone solvent, the alcohol solvent, the amide solvent and the hydrocarbon solvent, and more preferably, at least one of the solvents selected from the group consisting of toluene, methyl ethyl ketone, methyl isobutyl ketone and acetylacetone.

When dispersing the fine particles in the solvent, a dispersant may be added to the solvent. Representative dispersants are the following: a low molecular weight anionic compound such as fatty acid salt (soap), α-sulfo fatty acid ester salt (MES), alkyl benzene sulfonate (ABS), linear alkyl benzene sulfonate (LAS), alkyl sulfate (AS), alkyl ether sulfate salt (AES) and alkyl sulfate triethanol; a low molecular weight nonionic compound such as fatty acid ethanolamide, polyoxyethylene alkyl ether (AE), polyoxyethylene alkyl phenyl ether (APE), sorbitol and sorbitane; a low molecular weight cationic compound such as alkyltrimethylammonium salt, dialkyldimethylammonium chloride and alkylpyridinium chloride; a low molecular weight zwitterion compound such as alkylcarboxybetaine, sulfobetaine and lecithin; a high molecular weight aqueous dispersant represented by formaldehyde condensate of naphthalenesulfonate, polystyrenesulfonate, polyacrylate salt, copolymer salt of vinyl compound and calboxylic acid monomer, carboxymethyl cellulose, polyvinyl alcohol and the like; a high molecular weight non-aqueous dispersant such as polyacrylic acid partial alkyl ester and polyalkylenepolyamine; and a high molecular weight cationic dispersant such as polyethyleneimine and aminoalkyl methacrylate copolymer. However, any dispersant having a configuration other than the dispersants stated above may be used provided that it could be suitably applied to the fine particles used in the present invention.

As specific trade names of the above dispersants added to the solvent, for example, the following are known: FLOWLEN™ DOPA-15B and FLOWLEN™ DOPA-17 (both manufactured by Kyoeisha Chemical Co., Ltd.); Solplus™ AX5, Solplus™ TX5, Solsperse™ 9000, Solsperse™ 12000, Solsperse™ 17000, Solsperse™ 20000, Solsperse™ 21000, Solsperse™ 24000, Solsperse™ 26000, Solsperse™ 27000, Solsperse™ 28000, Solsperse™ 32000, Solsperse™ 35100, Solsperse™ 54000 and Solthix™ 250 (all manufactured by Lubrizol Japan Limited); EFKA® 4008, EFKA® 4009, EFKA® 4010, EFKA® 4015, EFKA® 4046, EFKA® 4047, EFKA® 4060, EFKA® 4080, EFKA® 7462, EFKA® 4020, EFKA® 4050, EFKA® 4055, EFKA® 4400, EFKA® 4401, EFKA® 4402, EFKA® 4403, EFKA® 4300, EFKA® 4320, EFKA® 4330, EFKA® 4340, EFKA® 6220, EFKA® 6225, EFKA® 6700, EFKA® 6780, EFKA® 6782 and EFKA® 8503 (all manufactured by BASF Japan Ltd.); AJISPER® PA111, AJISPER® PB711, AJISPER® PB821, AJISPER® PB822, AJISPER® PN411 and Famex L-12 (all manufactured by Ajinomoto Fine-Techno Co., Ltd.); TEXAPHOR®-UV21 and TEXAPHOR®-UV61 (both manufactured by BASF Japan Ltd.); DISPERBYK®-101, DISPER- BYK®-102, DISPERBYK®-106, DISPERBYK®-108, DISPERBYK®-111, DISPERBYK®-116, DISPERBYK®-130, DISPERBYK®-140, DISPERBYK®-142, DISPERBYK®-145, DISPERBYK®-161, DISPERBYK®-162, DISPERBYK®-163, DISPERBYK®-164, DISPERBYK®-166, DISPERBYK®-167, DISPERBYK®-168, DISPERBYK®-170, DISPERBYK®-171, DISPERBYK®-174, DISPERBYK®-180, DISPERBYK®-182, DISPERBYK®-192, DISPERBYK®-193, DISPERBYK®-2000, DISPERBYK®-2001, DISPERBYK®-2020, DISPERBYK®-2025, DISPERBYK®-2050, DISPERBYK®-2070, DISPERBYK®-2155, DISPERBYK®-2164, BYK® 220S, BYK® 300, BYK® 306, BYK® 320, BYK® 322, BYK® 325, BYK® 330, BYK® 340, BYK® 350, BYK® 377, BYK® 378, BYK® 380N, BYK® 410, BYK® 425 and BYK® 430 (all manufactured by BYK Japan KK); DISPARLON® 1751N, DISPARLON® 1831, DISPARLON® 1850, DISPARLON® 1860, DISPARLON® 1934, DISPARLON® DA-400N, DISPARLON® DA-703-50, DISPARLON® DA-725, DISPARLON® DA-705, DISPARLON® DA-7301, DISPARLON® DN-900, DISPARLON® NS-5210, DISPARLON® NVI-8514 L, HIPLAAD® ED-152, HIPLAAD® ED-216, HIPLAAD® ED-251 and HIPLAAD® ED-360 (all manufactured by Kusumoto Chemicals, Ltd.); FTX-207S, FTX-212P, FTX-220P, FTX-220 S, FTX-228P, FTX-710LL, FTX-750LL, FTERGENT® 212P, FTERGENT® 220P, FTERGENT® 222F, FTERGENT® 228P, FTERGENT® 245F, FTERGENT® 245P, FTERGENT® 250, FTERGENT® 251, FTERGENT® 710FM, FTERGENT® 730FM, FTERGENT® 730LL, FTERGENT® 730LS, FTERGENT® 750DM and FTERGENT® 750FM (all manufactured by Neos Company Limited); AS-1100, AS-1800 and AS-2000 (all manufactured by Toagosei Company, Limited); KAOCER® 2000, KAOCER® 2100, KDH-154, MX-2045 L, HOMOGENOL® L-18, HOMOGENOL® L-95, RHEODOL® SP-010V, RHEODOL® SP-030V, RHEODOL® SP-L100 and RHEODOL® SP-P10 (all manufactured by Kao Corporation); EPAN U103, SHALLOL® DC902B, NOIGEN® EA-167, PLYSURF® A219B and PLYSURF® AL (all manufactured by Dai-ichi Kogyo Seiyaku Co., Ltd,); MEGAFAC® F-477, MEGAFAC® 480SF and MEGAFAC® F-482 (all manufactured by DIC Corporation); SILFACE® SAG 503A and Dynol 604 (both manufactured by Nissin Chemical Industry Co., Ltd.); SN-SPERSE 2180, SN-SPERSE 2190 and SN-LEVELER S-906 (all manufactured by SAN NOPCO LIMITED); and S-386 and S-420 (both manufactured by AGC Seimi Chemical Co., Ltd.).

In the high refractive index resin layer and the low refractive index resin layer, the fine particles are dispersed in the resin binder. The resin binder is not particularly limited provided that it can maintain the fine particles dispersed therein. Examples of the resin binder include a thermoplastic resin, thermosetting resin and photocurable resin.

Examples of the thermoplastic resin include, but are not limited to: a high density polyethylene resin; a (non-linear) low density polyethylene resin; a linear low density polyethylene resin; an ultra low density polyethylene resin; a polypropylene resin; a polybutadiene resin; a cyclic olefin resin; a polymethylpentene resin; a polystyrene resin; an ethylene-vinylacetate copolymer; an ionomer resin; an ethylene vinyl alcohol copolymer resin; an ethylene-ethyl acrylate copolymer; a styrene-acrylonitrile resin; an acrylonitrile—chlorinated polystyrene-styrene copolymer resin; an acrylonitrile-acrylic rubber-styrene copolymer resin; an acrylonitrile-butadiene-styrene copolymer resin; an acrylonitrile-EPDM (ethylene-propylene-diene monomer)-styrene copolymer resin; a silicone rubber-acrylonitrile-styrene copolymer resin; a cellulose acetate butyrate resin; a cellulose acetate resin; an acrylic resin (methacrylic resin); an ethylene—methyl methacrylate copolymer; an ethylene-ethyl acrylate copolymer; a vinyl chloride resin; a chlorinated polyethylene resin; a polytetrafluoroethylene resin; a tetrafluoroethylene-hexafluoropropylene copolymer resin; a tetrafluoroethylene-perfluoroalkylvinyl ether copolymer resin; a tetrafluoroethylene-ethylene copolymer resin; a polytrifluorochloroethylene resin; polyvinylidene fluoride resin; a nylon 4,6; a nylon 6; a nylon 6,6; a nylon 6,10; a nylon 6,12; a nylon 12; a nylon 6T; a nylon 9T; an aromatic nylon resin; a polyacetal resin; an ultra high molecular weight polyethylene resin; a polybutylene terephthalate resin; a PET resin; a polyethylene naphthalate resin; an amorphous copolyester resin; a polycarbonate resin; a modified polyphenylene ether resin; a thermoplastic polyurethane elastomer; a polyphenylene sulfide resin; a polyether ether ketone resin; a liquid crystal polymer; a polyfluoroalkoxy resin; polyether imide resin; a polysulphone resin; polyketone resin; a thermoplastic polyimide resin; a polyamide imide resin; a polyarylate resin; a polyether sulfone resin; a biodegradable resin and a biomass resin. Also, the thermoplastic resin may be a combination of two or more of the above resins.

The thermosetting resin is not particularly limited provided that it is a compound having a functional group that is capable of being cured by heating. Examples of such a thermosetting resin include a curable compound having a cyclic ether group such as an epoxy group and an oxetanyl group. The photocurable resin is not particularly limited provided that it is a compound having a functional group that is capable of being cured by photoirradiation. Examples of such a photocurable resin include a resin having an unsaturated double bond-containing group such as a vinyl group, a vinyl ether group, an allyl group, a maleimide group and a (meth)acrylic group.

The curable compound having the cyclic ether group is not particularly limited. Examples of the curable compound include an epoxy resin other than the alicyclic epoxy resin, an alicyclic epoxy resin, an oxetane resin and a furan resin. Among the above resins, the epoxy resin other than the alicyclic epoxy resin, the alicyclic epoxy resin and the oxetane resin are suitable in consideration of the reaction rate and the versability. The epoxy resin other than the alicyclic epoxy resin is not particularly limited. Examples of the epoxy resin other than the alicyclic epoxy resin include: a novolak type epoxy resin such as a phenol novolak type epoxy resin, a cresol novolak type epoxy resin, a biphenyl novolak type epoxy resin, trisphenol novolak type epoxy resin and a dicyclopentadiene novolak type epoxy resin; and a bisphenol type epoxy resin such as a bisphenol A type epoxy resin, a bisphenol F type epoxy resin, a 2,2'-diallyl bisphenol A type epoxy resin, a hydrogenated bisphenol type epoxy resin and a polyoxypropylene bisphenol A type epoxy resin. As the epoxy resin other than the alicyclic epoxy resin, a glycidylamine type epoxy resin can be also exemplified.

Examples of commercial products of the above epoxy resins include the phenol novolak type epoxy resins such as EPICLON® N-740, EPICLON® N-770 and EPICLON® N-775 (all manufactured by DIC Corporation), and EPIKOTE® 152 and EPIKOTE® 154 (both manufactured by Mitsubishi Chemical Corporation); the cresol novolak type epoxy resins such as EPICLON® N-660, EPICLON® N-665, EPICLON® N-670, EPICLON® N-673, EPICLON® N-680, EPICLON® N-695, EPICLON® N-665-EXP and EPICLON® N-672-EXP (all manufactured by DIC Corporation); the biphenyl novolak type epoxy resins such as NC-3000P (manufactured by Nippon Kayaku Co., Ltd.); the trisphenol novolak type epoxy resins such as EP 1032S50 and EP 1032H60 (both manufactured by Mitsubishi Chemical Corporation); the dicyclopentadiene novolak type epoxy resins such as XD-1000-L (manufactured by Nippon Kayaku Co., Ltd.) and EPICLON® HP-7200 (manufactured by DIC Corporation); the bisphenol A type epoxy compounds such as EPIKOTE® 828, EPIKOTE® 834, EPIKOTE® 1001 and EPIKOTE® 1004 (all manufactured by Japan Epoxy Resins Co., Ltd), and EPICLON® 850, EPICLON® 860 and EPICLON® 4055 (all manufactured by DIC Corporation); the bisphenol F type epoxy resins such as EPIKOTE® 807 (manufactured by Mitsubishi Chemical Corporation) and EPICLON® 830 (manufactured by DIC Corporation); the 2,2'-diallyl bisphenol A type epoxy resins such as RE-810 NM (manufactured by Nippon Kayaku Co., Ltd.); the hydrogenated bisphenol type epoxy resins such as ST-5080 (manufactured by NIPPON STEEL & SUMIKIN CHEMICAL CO., LTD.); and the polyoxypropylene bisphenol A type epoxy resins such as EP-4000 and EP-4005 (both manufactured by ADEKA CORPORATION).

The alicyclic epoxy resin is not particularly limited. Examples of the alicyclic epoxy resin include CELOXIDE® 2021, CELOXIDE® 2080 and CELOXIDE® 3000 (all manufactured by DAICEL-ALLNEX LTD.). Examples of the commercial products of the oxetane resin include ETERNACOLL® EHO, ETERNACOLL® OXBP, ETERNACOLL® OXTP and ETERNACOLL® OXMA (all manufactured by Ube Industries, Ltd.). The curable compound having the cyclic ether group may be used singularly or may be used in combination of two kinds or more.

The photocurable resin having the unsaturated double bond-containing group is not particularly limited. Examples of such a photocurable resin include a resin having a group such as a vinyl group, a vinyl ether group, an allyl group, a maleimide group and a (meth)acrylic group. Among the resins having the above groups, a resin having a (meth) acrylic group is preferable in consideration of the reaction rate and the versability. Note that in this Specification, the (meth)acrylic group means an acrylic group or a methacrylic group.

Examples of the resin having the (meth)acrylic group include: 2-hydroxyethyl (meth)acrylate; 2-hydroxypropyl (meth)acrylate; 1,4-butanediol mono(meth)acrylate; carbitol (meth)acrylate; acryloyl morpholine; half ester which is a reactant of hydroxyl group-containing (meth)acrylate and polycarboxylic acid anhydride; polyethylene glycol di(meth)acrylate; tripropylene glycol di(meth)acrylate; trimethylolpropane tri(meth)acrylate; trimethylolpropane polyethoxy tri(meth)acrylate; glycerin polypropoxy tri(meth)acrylate; di(meth)acrylate of ε-caprolactone adduct of neopentyl glycol hydroxypivalate (e.g., KAYARAD® HX-220 and KAYARAD® HX-620 manufactured by Nippon Kayaku Co., Ltd.); pentaerythritol tetra(meth)acrylate; poly(meth)acrylate which is a reactant of dipentaerythritol and ε-caprolactone; dipentaerythritol poly(meth)acrylate (e.g., KAYARAD® DPHA manufactured by Nippon Kayaku Co., Ltd.); epoxy (meth)acrylate which is a reactant of (meth) acrylic acid and a monoglycidyl compound or a polyglycidyl compound. Note that in this Specification, the (meth)acrylate means acrylate or methacrylate and the (meth)acrylic acid means acrylic acid or methacrylic acid.

The glycidyl compound (i.e., the monoglycidyl compound or the polyglycidyl compound) used for epoxy (meth) acrylate which is a reactant of (meth)acrylic acid and the monoglycidyl compound or the polyglycidyl compound is not particularly limited. Examples of the above glycidyl compound include glycidyl-etherified products of polyphenols such as: bisphenol A; bisphenol F; bisphenol S; 4,4'-biphenol; tetramethyl bisphenol A; dimethyl bisphenol A; tetramethyl bisphenol F; dimethyl bisphenol F; tetramethyl bisphenol S; dimethyl bisphenol S; tetramethyl-4,4'-biphenol; dimethyl-4,4'-biphenol; 1-(4-hydroxyphenyl)-2-[4-(1, 1-bis(4-hydroxyphenyl)ethyl)phenyl]propane; 2,2'-methylenebis(4-methyl-6-tert-butylphenol); 4, 4'-butylidene-bis(3-methyl-6-tert-butylphenol); tris(hydroxyphenyl)methane; resorcinol; hydroquinone; pyrogallol; phenols having a diisopropylidene skeleton; phenols having a fluorene skeleton such as 1,1-di-4-hydroxyphenyl fluorene; phenolated polybutadiene; brominated bisphenol A; brominated bisphenol F; brominated bisphenol S; brominated phenol novolak; brominated cresol novolak; chlorinated bisphenol S; and chlorinated bisphenol A.

The epoxy (meth)acrylate which is a reactant of (meth) acrylic acid and the monoglycidyl compound or the polyglycidyl compound can be obtained by performing an esterification reaction of an epoxy group (glycidyl group) of the monoglycidyl compound or the polyglycidyl compound with an equivalent of (meth)acrylic acid. Such a synthesis reaction can be carried out using the generally known method. For example, to resorcin diglycidyl ether, an equivalent of (meth)acrylic acid is added along with a catalyst (e.g., benzyldimethylamine, triethylamine, benzyltrimethylammonium chloride, triphenylphosphine and triphenylstibine) and a polymerization inhibitor (e.g., methoquinone, hydroquinone, methylhydroquinone, phenothiazine and dibutylhydroxytoluene). Thus, the esterification reaction is performed at 80 to 110° C. The obtained (meth)acrylated resorcin diglycidyl ether is a resin having a radical polymerizable (meth)acryloyl group. Note that in this Specification, (meth)acrylated means acrylated or methacrylated and the (meth)acryloyl group means an acryloyl group or a methacryloyl group.

To the resin binder contained in the infrared shielding sheet of the present invention, when it is a photocurable resin, a photopolymerization initiator can be added, if necessary. When the resin binder is a thermosetting resin, it is possible, if necessary, to add a hardener to the resin binder. The above photopolymerization initiator is not particularly limited provided that it is to polymerize an unsaturated double bond, an epoxy group, or the like in the photocurable resin by the photoirradiation. Examples of the photopolymerization initiator include a cationic polymerization type photopolymerization initiator and a radical polymerization type photopolymerization initiator. Also, it is possible to use photopolymerization initiators exemplified later in the item "Cholesteric Liquid Crystal Film". Also, the hardener is not particularly limited provided that it causes the reaction of an unsaturated double bond, an epoxy group, or the like in the thermosetting resin by heating so that they are cross-linked. The examples of the hardener include acid anhydrides, amines, phenols, imidazoles, dihydrazines, Lewis acids, Bronsted acid salts, polymercaptans, isocyanates and block isocyanates.

The content of the fine particles in the at least one high refractive index resin layer is preferably 40 wt % or more based on the total of the at least one high refractive index resin layer, more preferably 50 wt % or more, still more preferably 60 wt % or more, particularly preferably 70 wt % or more, and most preferably 90 wt % or more. If the content of the fine particles in the at least one high refractive index resin layer is less than 40 wt %, the refractive index of the resin binder in the at least one high refractive index resin layer is dominant, thus it is not possible to effectively reflect the light in the infrared region. The content of the fine particles in the at least one high refractive index resin layer is preferably 95 wt % or less based on the total of the at least one high refractive index resin layer. If the content of the fine particles in the at least one high refractive index resin layer is more than 95 wt %, the ratio of the resin binder in the at least one high refractive index resin layer decreases, thus it is difficult to manufacture the infrared shielding sheet in the shape of a sheet.

The content of the fine particles in the at least one low refractive index resin layer is preferably 40 wt % or more based on the total of the at least one low refractive index resin layer, more preferably 50 wt % or more, still more preferably 60 wt % or more, particularly preferably 70 wt % or more, and most preferably 90 wt % or more. If the content of the fine particles in the at least one low refractive index resin layer is less than 40 wt %, the refractive index of the resin binder in the at least one low refractive index resin layer is dominant, thus the infrared reflecting function of the infrared shielding sheet is reduced. The content of the fine particles in the at least one low refractive index resin layer is preferably 95 wt % or less based on the total of the at least one low refractive index resin layer. If the content of the fine particles in the at least one low refractive index resin layer is more than 95 wt %, the ratio of the resin binder in the at least one low refractive index resin layer decreases, thus it is difficult to manufacture the infrared shielding sheet in the shape of a sheet. Furthermore, if the content of the fine particles in the at least one low refractive index resin layer is more than 95 wt % under the condition that the fine particles contained in the at least one low refractive index resin layer are electrically conductive fine particles, the fine particles are adhered to each other, which reducing the radio wave transmissibility property of the infrared shielding sheet.

The surface resistance of the high refractive index resin layer and the low refractive index resin layer is preferably 1 k$\Omega$/□ ($10^3 \Omega$/□) or more, more preferably 10 k$\Omega$/□ ($10^4 \Omega$/□) or more, still more preferably 1000 k$\Omega$/□ ($10^6 \Omega$/□) or more. If the surface resistance of the high refractive index resin layer and the low refractive index resin layer is less than 1 k$\Omega$/□, it is undesirable because the infrared shielding sheet hardly transmits the radio wave.

The maximum surface height difference (surface roughness) of the at least one high refractive index resin layer and the at least one low refractive index resin layer is preferably 70 nm or less, more preferably 60 nm or less, still more preferably 50 nm or less. After dispersing the fine particles in the dispersion liquid until there is no aggregation of the fine particles, the dispersion liquid is applied (coated) so as to form the at least one high refractive index resin layer and the at least one low refractive index resin layer. Thus, it is possible to obtain the desirable maximum surface height difference of the at least one high refractive index resin layer and the at least one low refractive index resin layer. If the at least one high refractive index resin layer and the at least one low refractive index resin layer have the surface roughness (the maximum surface height difference) of more than 70 nm, the incident infrared light is scattered on the surface of the at least one high refractive index resin layer and the at least one low refractive index resin layer. Thus, it is not possible to give a good reflecting function to the infrared shielding sheet.

The method for manufacturing the infrared shielding sheet of the present invention preferably includes the step of forming the high refractive index resin layer and the low refractive index resin layer by application method. The infrared shielding sheet of the present invention is preferably manufactured by a method including the steps of applying and drying application liquid for forming the high refractive index resin layer and the low refractive index resin layer on the support such as the transparent support using the applying method appropriately selected from the publicly known applying methods. The method for applying the application liquid is not particularly limited. Examples of the method include methods using the following coating apparatuses: bar coaters such as a wire bar coater; a spin coater; a die coater; a micro gravure coater; a comma coater; a spray coater; a roll coater; a knife coater and the like. For the smoothness of the surface of the high refractive index resin layer and the low refractive index resin layer, the methods using the coating apparatuses suitable for manufacturing fine films are preferable, the coating apparatuses such as the bar coater, the spin coater, the die coater and the micro gravure coater.

Also, the infrared shielding sheet may be formed, according to the intended use, by laminating at least one function layer such as a cholesteric liquid crystal film, a birefringence multilayer film, an adhesive layer, and/or a hard coat layer on the laminated film composed of the high refractive index resin layer and the low refractive index resin layer (or on the sheet composed of the laminated film and the transparent support). Furthermore, various additives such as an infrared absorption coloring matter, an ultraviolet absorbent, an antioxidant and a photostabilizer may be added, as needed, in the high refractive index resin layer and the low refractive index resin layer, or in the function layer laminated as necessary.

In order to block the light in the infrared region that cannot be blocked by the laminated film composed of the high refractive index resin layer and the low refractive index resin layer, the infrared shielding sheet may be formed by the laminated film combined with the publicly known materials such as an infrared absorption coloring matter, a cholesteric liquid crystal film and a birefringence multilayer film. Preferably, the infrared absorption coloring matter selectively absorbs the light having the wavelength from 780 to 2000 nm. Preferably, the cholesteric liquid crystal film selectively reflects the light having the wavelength from 780 to 2000 nm.

[Infrared Absorption Pigment]

The infrared absorption coloring matter is not particularly limited. However, in particular, it is possible to use infrared absorption coloring matters having the absorption maximum at the wavelength from 750 nm to 1100 nm, for example, a phthalocyanine coloring matter, an anthraquinone coloring matter, a dithiol coloring matter, a diimmonium coloring matter, a squarylium coloring matter, a naphthalocyanine coloring matter, an aminium coloring matter, an organometallic complex coloring matter such as a dithiol metal complex coloring matter, a cyanine coloring matter, an azo coloring matter, a polymethine coloring matter, a quinone coloring matter, a diphenylmethane coloring matter, a triphenylmethane coloring matter and a mercaptonaphthol coloring matter.

Among the above, at least one of the phthalocyanine coloring matter, the naphthalocyanine coloring matter, and the anthraquinone coloring matter is suitable for using as the infrared absorption coloring matter.

[Cholesteric Liquid Crystal Film]

In the cholesteric liquid crystal film, the molecular axis is aligned in one direction on one plane, however, the molecular axis is slightly shifted by a certain angle on a next plane, and further shifted by a certain angle in a further next plane. Thus, the angle of the molecular axis is successively shifted toward the normal direction of the plane. Such a structure in which the molecular axis is twisted is called a chiral structure. It is preferable that the normal (chiral axis) of the plane is substantially parallel to the thickness direction of the cholesteric liquid crystal film (cholesteric liquid crystal layer).

When the light enters the cholesteric liquid crystal film, either of the clockwise or the counterclockwise circularly polarized light in a specific wavelength region is reflected. In the chiral structure, when the screw axis indicating the rotation axis around which is twisted the molecular axis of the liquid crystal compound constituting the cholesteric liquid crystal film is parallel to the normal of the cholesteric liquid crystal film, the pitch length p of the chiral structure and the wavelength $\lambda_c$ of the reflected circularly polarized light satisfy the following relational expressions (2) and (3):

$$\lambda_c = n \times p \times \cos\theta \tag{2}$$

$$n_0 \times p \times \cos\theta \leq \lambda \leq n_e \times p \times \cos\theta \tag{3}$$

where $\lambda_c$ represents the center wavelength in the wavelength region of the light reflected by the cholesteric liquid crystal film, no represents the refractive index in the minor axis direction of the molecules of the liquid crystal compound constituting the cholesteric liquid crystal film, $n_e$ represents the refractive index in the major axis direction of the molecules in the liquid crystal compound, n represents $(n_0+n_e)/2$, and $\theta$ represents the incident angle (angle from the normal of the surface) of the light.

From this, it can be seen that the center wavelength in the wavelength region of the light reflected by the cholesteric liquid crystal film depends on the pitch length of the chiral structure in the cholesteric liquid crystal film. Thus, by changing the pitch length of the chiral structure, it is possible to change the center wavelength in the wavelength region of the light reflected by the cholesteric liquid crystal film.

The number of the layer(s) of the cholesteric liquid crystal film may be one, or may be more than one. When the cholesteric liquid crystal film has more than one layer, it is possible to widen the infrared wavelength band that is reflected by the cholesteric liquid crystal film, thus it is preferable.

When the cholesteric liquid crystal film has more than one layer, it is preferable to combine the cholesteric liquid crystal layers that have different twisting directions of the molecular axis so as to further effectively reflect the light in the center wavelength region to be reflected. This enables the cholesteric liquid crystal film to reflect both of the clockwise circularly polarized light and the counterclockwise circularly polarized light, which realizes the effective reflectance. When it is desired to widen the wavelength region of the light to be reflected by the cholesteric liquid crystal film having more than one layer, combination of the cholesteric liquid crystal layers having different pitch lengths is preferable. Moreover, by combination of the cholesteric liquid crystal layers having different twisting directions, it is possible to widen the infrared wavelength region, the light in which is effectively reflected. As to the number of the layers and the combination of the cholesteric liquid crystal films for reflecting the clockwise circularly polarized light and for reflecting the counterclockwise circularly polarized light, it is possible to adopt an appropriate combination in consideration of the manufacturing cost, the visible light transmittance and the like.

As the cholesteric liquid crystal material for forming the cholesteric liquid crystal film, it is preferable to use a curable liquid crystal composition. Examples of the liquid crystal composition include at least a rod-like liquid crystal compound, an optically active compound (chiral compound) and a polymerization initiator. More than one component may be contained. For example, a polymerizable rod-like liquid crystal compound and a non-polymerizable rod-like liquid crystal compound may be used in combination. Also, it is possible to use a low molecular weight rod-like liquid crystal compound and a high molecular weight rod-like liquid crystal compound in combination. Furthermore, in order to improve the orientation uniformity, the application suitability and the film strength, the liquid crystal composition may contain at least one selected from the various additives such as a horizontal orientation agent, an ununiformity preventive agent, a cissing preventive agent and a polimerizable monomer (neither the rod-like liquid crystal compound nor the optically active compound, e.g., a monomer having a (meth)acrylic group). Also, it is possible to add to the liquid crystal composition, as needed, a polymerization inhibitor, an antioxidant, an ultraviolet absorber, a photostabilizer, a coloring material, a metal oxide fine particles and the like to the extent that the optical performance is not degraded.

(1) Rod-Like Liquid Crystal Compound

As the rod-like liquid crystal compound, a rod-like nematic liquid crystal compound is preferable. Suitable examples of the rod-like nematic liquid crystal compound include the low molecular weight liquid crystal compounds and the high molecular weight liquid crystal compounds such as azomethines, azoxys, cyanobiphenyls, cyanophenylesters, benzoic acid esters, cyclohexanecarboxylic acid phenyl esters, cyanophenylcyclohexanes, cyano-substituted phenylpyrimidines, phenyldioxanes, tolans and alkenylcyclohexylbenzonitriles.

The rod-like liquid crystal compound may be polymerizable or may be non-porimerizable. Various documents (for example, Y. Goto et al., *Mol. Cryst. Liq. Cryst.*, 1995, Vol. 260, pp. 23-28) describe the rod-like liquid crystal compound not having the polimerizable group (non-polymerizable rod-like liquid crystal compound).

The polymerizable rod-like liquid crystal compound can be obtained by introducing a polymerizable group to the rod-like liquid crystal compound. Examples of the polymerizable group include an unsaturated polymerizable group, an epoxy group, and an aziridinyl group. As the polymerizable group, the unsaturated polymerizable group is preferable, an ethylenically unsaturated polymerizable group is more preferable. The polymerizable groups can be introduced in molecules of the rod-like liquid crystal compound using various methods. The number of the polymerizable group that the polymerizable rod-like liquid crystal compound has is preferably 1 to 6, more preferably 1 to 3. Examples of the polymerizable rod-like liquid crystal compound include the compounds described, for example, in: *Makromol. Chem.*, volume 190, p. 2255 (1989); *Advanced Materials*, volume 5, p. 107 (1993); U.S. Pat. No. 4,683,327; U.S. Pat. No. 5,622,648; U.S. Pat. No. 5,770,107; WO 95/22586; WO 95/24455, WO 97/00600; WO 98/23580; WO 98/52905; JP H01-272551 A; JP H06-016616 A; JP H07-110469 A; JP H11-080081; and JP 2001-328973 A. It is possible to use two or more polymerizable rod-like liquid crystal compounds in combination. By using two or more polymerizable rod-like liquid crystal compounds in combination, the orientation temperature can be reduced.

(2) Optically Active Compound (Chiral Agent)

The liquid crystal composition exhibits the cholesteric liquid crystal phase, thus, preferably it contains an optically active compound. However, if the molecules of the rod-like liquid crystal compound have asymmetric carbon atoms, the cholesteric liquid crystal film can be stably formed in some circumstances, without addition of the optically active compound. As the optically active compound, it is possible to select from the various publicly known chiral agents (for example, described in EKISHO DEBAISU HAND BOOK, chapter 3, item 4-3, TN, STN Chiral Agent, p. 199, JAPAN SOCIETY FOR THE PROMOTION OF SCIENCE, 142th committee, 1989). Generally, the optically active compound includes asymmetric carbon atoms. However, it is also possible to use, as the chiral agent, an axially chiral compound or a planar chiral compound not including the asymmetric carbon atom. Examples of the axially chiral compound or a planar chiral compound include binaphthyl, helicene, paracyclophane and derivatives thereof. The optically active compound (chiral agent) may have a polymerizable group. When the optically active compound has a polymerizable group (i.e., the polymerizable optically active compound) and the rod-like liquid crystal compound used in combination therewith also has a polymerizable group (i.e., the polymerizable rod-like liquid crystal compound), due to a polymerization reaction of the polymerizable optically active compound and the polymerizable rod-like liquid crystal compound, it is possible to form a polymer having a repeating unit derived from the rod-like liquid crystal compound and a repeating unit derived from the optically active compound. In this aspect, the polymerizable group that the polymerizable optically active compound has is preferably the same kind as the polymerizable group that the polymerizable rod-like liquid crystal compound has. Therefore, the polymerizable group of the optically active compound is preferably an unsaturated polymerizable group, an epoxy group or an aziridinyl group, and more preferably, an unsaturated polymerizable group, and still more preferably an ethylenically unsaturated polymerizable group. Also, the optically active compound may be a liquid crystal compound.

The amount of the optically active compound in the liquid crystal composition is preferably 0.1 to 30 parts by mol to 100 parts by mol of the liquid crystal compound used therewith. Reduction in the amount of the optically active compound to be used is preferable, which is likely to not affect the liquid crystal property of the liquid crystal composition. Therefore, the optically active compound to be used as the chiral agent is preferably a compound having a strong torsion so that the small amount thereof can achieve a desirable twisting orientation of the helical pitch. Such a chiral agent having a strong torsion is, for example, described in Patent Document JP 2003-287623 A, which can be suitable for use.

(3) Polymerization Initiator

The liquid crystal composition used for forming the cholesteric liquid crystal film (a light reflecting layer) is preferably a polymerizable liquid crystal composition, accordingly, it is preferable to contain a polymerization initiator. In case of progressing the curing reaction of the polymerizable liquid crystal composition by ultraviolet irradiation, the polymerization initiator to be used is preferably a photopolymerization initiator capable of starting the polymerization reaction by the ultraviolet irradiation. The above photopolymerization initiator is not particularly limited. Examples of the photopolymerization initiator include: 2-methyl-1-[4-(methylthio)phenyl]-2-morpholinopropan-1-one ("IRGACURE® 907" manufactured by BASF Japan Ltd.); 1-hydroxycyclohexyl phenyl ketone ("IRGACURE® 184" manufactured by BASF Japan Ltd.); 4-(2-hydroxyethoxy)phenyl 2-hydroxy-2-propyl ketone ("IRGACURE® 2959" manufactured by BASF Japan Ltd.); 1-(4-dodecylphenyl)-2-hydroxy-2-methylpropan-1-one ("DAROCUR® 953" manufactured by Merck KGaA); 1-(4-isopropylphenyl)-2-hydroxy-2-methylpropan-1-one ("DAROCUR® 1116" manufactured by Merck KGaA); 2-hydroxy-2-methyl-1-phenylpropan-1-one ("IRGACURE® 1173" manufactured by BASF Japan Ltd.); acetophenone compounds such as diethoxyacetophenone, benzoin compounds such as benzoin, benzoin methyl ether, benzoin ethyl ether, benzoin isopropyl ether, benzoin isobutyl ether and 2,2-dimethoxy-2-phenylacetophenone ("IRGACURE® 651" manufactured by BASF Japan Ltd.); benzophenone compounds such as benzoylbenzoic acid, methyl o-benzoylbenzonate, 4-phenylbenzophenone, hydroxybenzophenone, 4-benzoyl-4'-methyldiphenylsulfide and 3,3'-dimethyl-4-methoxybenzophenone ("KAYACURE® MBP" manufactured by Nippon Kayaku Co., Ltd.);

thioxanthone compounds such as thioxanthone, 2-chlorothioxanthone ("KAYACURE® CTX" manufactured by Nippon Kayaku Co., Ltd.), 2-methylthioxanthone, 2,4-dimethylthioxanthone ("KAYACURE® RTX" manufactured by Nippon Kayaku Co., Ltd.), isopropylthioxanthone, 2,4-dichlorothioxanthone ("KAYACURE® CTX" manufactured by Nippon Kayaku Co., Ltd.), 2,4-diethylthioxanthone ("KAYACURE® DETX" manufactured by Nippon Kayaku Co., Ltd.) and 2,4-diisopropylthioxanthone ("KAYACURE® DITX" manufactured by Nippon Kayaku Co., Ltd.); and 2,4,6-trimethylbenzoyl-diphenylphosphine oxide ("LUCIRIN® TPO" manufactured by BASF Japan Ltd.) The above photopolymerization initiator may be used singularly or may be used in combination of two kinds or more.

The content of the photopolymerization initiator in the polymerizable liquid crystal composition is not particularly limited. However, preferably 0.5 or more parts by weight of the photopolymerization initiator is contained with respect to 100 parts by weight of the total amount of the polymerizable liquid crystal compound and the polymerizable monomer used as needed. Also, the photopolymerization initiator in the amount of 10 or less parts by weight is preferable, and in particular, the amount of 2 or more parts by weight is preferable as well as the amount of 8 or less parts by weight is preferable.

When the benzophenone compound or the thioxanthone compound is used as the photopolymerization initiator, it is preferable to use a reaction auxiliary agent in combination in order to accelerate the photopolymerization reaction. The reaction auxiliary agent is not particularly limited. Examples of the reaction auxiliary agent include amine compounds such as triethanolamine, methyldiethanolamine, triisopropanolamine, n-butylamine, N-methyldiethanolamine, diethylaminoethyl methacrylate, michler's ketone, 4,4'-bis(diethylamino)benzophenone, ethyl 4-dimethylaminobenzonate, 2-n-butoxyethyl 4-dimethylaminobenzonate and isoamyl 4-dimethylaminobenzonate.

The content of the reaction auxiliary agent in the polymerizable liquid crystal composition is not particularly limited, however, preferably the content is in the range not affecting the liquid crystal property of the polymerizable liquid crystal composition. Preferably 0.5 or more parts by weight of the reaction auxiliary agent is contained with respect to 100 parts by weight of the total amount of the polymerizable liquid crystal compound and the polymerizable monomer used as needed. Also, the reaction auxiliary agent in the amount of 10 or less parts by weight is preferable, and in particular, the amount of 2 or more parts by weight is preferable as well as the amount of 8 or less parts by weight is preferable. Also, the content of the reaction auxiliary agent is preferably 0.5 to 2 times that of the photopolymerization initiator on the weight basis.

Furthermore, to the polymerizable liquid crystal composition, it is possible to add, as needed, a leveling agent, a defoamer, an ultraviolet absorber, a light stabilizer, an antioxidant, a polymerization inhibitor, a cross-linking agent, a plasticizer, inorganic fine particles, a filler and the like, so that an intended functionality can be given.

Examples of the leveling agent include a fluorine compound, a silicon compound, an acrylic compound and the like. Examples of the defoamer include a silicon defoamer, a fluorine deformer, a high molecular weight defoamer and the like. Examples of the ultraviolet absorber include a benzotriazole compound, a benzophenone compound, a triazine compound and the like. Examples of the light stabilizer include a hindered amine compound, a benzoate compound and the like. Examples of the antioxidant include a phenol compound and the like.

Examples of the polymerization inhibitor include methoquinone, methylhydroquinone, hydroquinone and the like. Examples of the cross-linking agent include polyisocyanates, a melamine compound and the like.

Examples of the plasticizer include phthalic acid ester such as dimethyl phthalate and diethyl phthalate; trimellitic acid ester such as tris(2-ethylhexyl)trimellitate; aliphatic dibasic acid ester such as dimethyl adipate and dibutyl adipate; orthophosphoric acid ester such as tributyl phosphate and triphenyl phosphate; and acetic acid ester such as glycerin triacetate and 2-ethylhexyl acetate.

Examples of the inorganic fine particles include: conductive metal oxide fine particles such as antimony acid zinc fine particles, gallium-doped zinc oxide fine particles, aluminum-doped zinc oxide fine particles, tin oxide fine particles, antimony-doped tin oxide fine particles, phosphorus-doped tin oxide fine particles and tin-doped indium oxide fine particles; and metal oxide fine particles for adjusting the refractive index such as titanium oxide fine particles and zirconium oxide fine particles. Examples of the filler include silica particles, acrylic beads, urethane beads and the like, whose average particle size is in micron order.

The application method for forming the cholesteric liquid crystal film is not particularly limited. Examples of the method include methods using the following coating apparatuses: bar coaters such as a wire bar coater; a spin coater; a die coater; a micro gravure coater; a comma coater; a spray coater; a roll coater; a knife coater and the like. For the smoothness of the surface of the cholesteric liquid crystal film, the methods using the coating apparatuses suitable for manufacturing fine films are preferable, the coating apparatuses such as the bar coater, the spin coater, the die coater and the micro gravure coater. Also, in order to further precisely define the orientation direction of the liquid crystal compound in the cholesteric liquid crystal film, it is possible to orientate the surface of the base (i.e., the multilayer film, the transparent support and the like) on which the cholesteric liquid crystal film is formed. For orientating the surface of the base, the surface of the base is preferably treated using the rubbing method so as to form an orientated surface.

[Birefringence Multilayer Film]

The birefringence multilayer film is formed by alternately laminating a layer having a birefringence (preferably a positive birefringence, hereinafter referred to as the "birefringence layer") and a layer having an isotropic refringence or a negative birefringence (hereinafter referred to as the "isotropic refringence layer"). The birefringence multilayer film is configured based on a coherence interferometry caused by: the difference in the refractive index between the birefringence layer and the isotropic refringence layer; and the respective geometric thicknesses. When the refractive index in the plane surface of the birefringence layer differs from that of the isotropic refringence layer, the boundary phase of the above two layers forms the reflecting surface.

The birefringence means that at least two refractive indexes differ from each other out of the respective refractive indexes of the x axis, the y axis and the z axis that are orthogonal to each other. When the x axis and the y axis are in the plane surface of the birefringence layer while the z axis is orthogonal to the plane surface of the birefringence layer, and furthermore the birefringence layer is constituted by the orientated polymers, the x axis direction is selected so that it is the direction having the maximum refractive index in the plane surface, and the x axis direction corresponds to one of the directions in which the orientated polymers are orientated (for example, stretched).

The respective refractive indexes in the plane surface of both the birefringence layer and the isotropic refringence layer differ depending on the layers (i.e., $n_{1x} \neq n_{2x}$ and $n_{1y} \neq n_{2y}$, where $n_{1x}$ and $n_{1y}$ represent the respective refractive indexes in the plane surface of the birefringence layer in the x axis direction and the y axis direction, and $n_{2x}$ and $n_{2y}$ represent the respective refractive indexes in the plane surface of the isotropic refringence layer in the x axis direction and the y axis direction). It is preferable that the respective refractive indexes of the birefringence layer and the isotropic refringence layer in the z axis direction are equal to each other, which results in the uniform reflectance over the visual angle range since the reflection of the p-polarized light does not depend on the incidence angle of the light.

In order to increase the refractive index in the plane surface of the birefringence layer, it is possible to increase the difference in the refractive index between the birefringence layer and the isotropic refringence layer by using a birefringence polymer (preferably a birefringence polymer having a positive birefringence) for the birefringence layer, the birefringence polymer being at least uniaxially orientated, or preferably, biaxially orientated.

The respective optical thicknesses of the birefringence layer and the isotropic refringence layer are controlled to be $\lambda_c/4$, where $\lambda_c$ represents the center wavelength of the wavelength region of the light reflected by the above layers. Alternatively, the birefringence layer may have the different optical thickness from that of the isotropic refringence layer to the extent that the optical thicknesses of the birefringence layer and the isotropic refringence layer total $\lambda_c/2$ (or a multiple number of $\lambda_c$). To constitute the birefringence layer, a material orientated (to have the positive birefringence) by being stretched is used. For example, PEN (polyethylene naphthalate), PET and the like are used. To constitute the isotropic refringence layer, a material not orientated (or orientated to have the negative birefringence) by being stretched is used. For example, PMMA (polymethyl methacrylate) and the like are used. Also, a material for the birefringence multilayer structure can be manufactured by forming the multilayer film to be stretched using, for example, the simultaneous co-extrusion method described in Patent Document JP 2008-528313 T. Since the difference in the refractive index between the birefringence layer and the isotropic refringence layer is small, it is preferable to laminate many birefringence layers and isotropic refringence layers. It is preferable that the number of the laminated layers (the total of the layers) of the birefringence layers and the isotropic refringence layers is in the range from 3 or more to 1000 or less, in consideration of the desirable wavelength region to be reflected, the manufacturing cost and the like.

[Interlayer Film for Laminated Glass]

The interlayer film for laminated glass of the present invention is characterized in comprising: the infrared shielding sheet of the present invention; and an interlayer film that is formed on at least one of outermost layers of the infrared shielding sheet. The interlayer film for laminated glass of the present invention preferably includes a first interlayer film and a second interlayer film formed on the respective outermost layers of both sides of the infrared shielding sheet of the present invention so as to easily form the laminated glass.

The interlayer film for laminated glass of the present invention preferably includes the second interlayer film in addition to the first interlayer film. In the normal interlayer film for laminated glass, the respective thicknesses of the first interlayer film and the second interlayer film of both sides of the infrared shielding sheet are the same. However, the present invention is not limited to the above aspect of the interlayer film for laminated glass. In the interlayer film for laminated glass of the present invention, the thickness of the first interlayer film may be different from the thickness of the second interlayer film. Also, the composition of the first interlayer film may be the same as or different from the composition of the second interlayer film.

The heat shrinkage before and after the step thermocompressively bonding the interlayer film for laminated glass including the first and the second interlayer films is preferably 1 to 20% in the range of heating temperature at the time, more preferably 2 to 15%, in particular, 2 to 10%. The first and the second interlayer films preferably have the respective thicknesses of 100 to 1000 μm, more preferably of 200 to 800 μm, still more preferably of 300 to 500 μm. Also, the first and second interlayer films may be thickened by laminating multiple sheets.

As the standard brittleness of the first and second interlayer films, the breaking elongation by the tension test is preferably 100 to 800%, more preferably, 100 to 600%, still more preferably 200 to 500%.

The interlayer film preferably contains polyvinyl butyral. The first and the second interlayer films are preferably resin interlayer films. The resin interlayer film is preferably a polyvinyl acetal resin film containing polyvinyl acetals as the main component. The polyvinyl acetal resin film is not particularly limited. For example, those described in Patent Documents JP H06-000926 A and JP 2007-008797 A may be preferably used. Among the polyvinyl acetal resin films, a polyvinyl butyral resin film (polyvinyl butyral film) is preferably used in the present invention. The polyvinyl butyral resin film is not particularly specified provided that it is a resin film containing polyvinyl butyral as the main component, and the polyvinyl butyral resin films widely used in the publicly known interlayer film for laminated glass may be adopted. Above all, in the present invention, the interlayer film is preferably a resin interlayer film containing polyvinyl butyral or ethylene vinyl acetate as the main component, and more preferably, is the resin interlayer film containing polyvinyl butyral as the main component. Note that the resin as the main component means a resin whose ratio in the resin interlayer film is 50 wt % or more.

The first and second interlayer films may contain an additive to the extent of not departing from the spirit and scope of the present invention. Examples of the additive include heat ray shielding fine particles, sound insulating fine particles and a plasticizer. Examples of the heat ray shielding fine particles and the sound insulating fine particles include inorganic fine particles and metallic fine particles. It is possible to obtain a heat shielding effect by dispersing and mixing the above fine particles in the elastic body of the first and second interlayer films as the resin interlayer films. At the same time, it is preferable to prevent sonic wave from propagating with the above configuration so as to obtain a vibration damping effect. The fine particle preferably has a spherical shape, however, not necessarily perfectly spherical. Also, the fine particles may be subjected to deformation. Also, it is preferable that the fine particles are dispersed in the interlayer film, more preferably, in the interlayer film composed of polyvinyl butyral (hereinafter referred to as "PVB"). The fine particles may be appropriately capsulated to add to the interlayer film, or may be added to the interlayer film along with a dispersant. In the case where the first and second interlayer films contain the resin component, the amount of the fine particles to be added is not particularly limited. However, the amount of the fine particles is preferably 0.1 to 10 parts by weight with respect to 100 parts by weight of the resin component.

Examples of the inorganic fine particles include calcium carbonate fine particles, alumina fine particles, kaolin clay, calcium silicate fine particles, magnesium oxide fine particles, magnesium hydroxide fine particles, aluminum hydroxide fine particles, magnesium carbonate fine particles, talc powder, feldspar powder, mica powder, barite powder, barium carbonate fine particles, titanium oxide fine particles, silica fine particles and glass beads. These may be used individually or used by being mixed.

Examples of the heat shielding fine particles include tin-doped indium oxide (ITO) fine particles, antimony-doped tin oxide (ATO) fine particles, aluminum-doped zinc oxide (AZO) fine particles, indium-doped zinc oxide (IZO) fine particles, tin-doped zinc oxide fine particles, silicon-doped zinc oxide fine particles, antimonic acid zinc fine particles, lanthanum haxaboride fine particles, cerium haxaboride fine particles, gold fine powder, silver fine powder, platinum fine powder, aluminum fine powder, iron fine powder, nickel fine powder, copper fine powder, stainless fine powder, tin fine powder, cobalt fine powder and alloy powder containing thereof. Examples of the light shielding agent include carbon black and red iron oxide. Examples of the pigment include a mixed pigment having dark reddish brown color made by mixing four kinds of pigments, i.e., a black pigment carbon black, a red pigment (C.I. Pigment Red), a blue pigment (C.I. Pigment Blue) and a yellow pigment (C.I. Pigment Yellow).

The plasticizer is not particularly limited, thus it is possible to use publicly known plasticizers that are generally used as the plasticizers for this type of interlayer film. Suitable examples of the plasticizer include triethylene glycoldi(2-ethylbutyrate) (3GH), triethylene glycoldi(2-ethylhexanoate) (3GO), triethylene glycoldi(n-heptanoate) (3G7), tetraethylene glycoldi(2-ethylhexanoate) (4GO), tetraethylene glycoldi(n-heptanoate) (4G7), oligoethylene glycoldi(2-ethylhexanoate) (NGO). When the interlayer film is the resin interlayer film, the above plasticizer is used generally in the amount from 25 to 70 parts by weight with respect to 100 parts by weight of resin (preferably polyvinyl acetal resin) being the main component of the resin interlayer film.

The method for manufacturing the interlayer film for laminated glass of the present invention preferably includes a step of heat-bonding the interlayer film and the infrared shielding sheet after laminating the infrared shielding sheet of the present invention and the interlayer film in order. The method for heat-bonding is not particularly limited. Thus, it is possible to adopt a thermocompression bonding method in which a heating body is pressed against the laminated body of the infrared shielding sheet and the interlayer film (i.e., the infrared shielding sheet on which the interlayer film is overlapped) and a heat welding method using heating by laser irradiation. Among the above, as the method for manufacturing the interlayer film for laminated glass of the present invention, it is preferable that the step of heat-bonding the infrared shielding sheet to the interlayer film is the step of thermocompressively bonding the infrared shielding sheet to the interlayer film (i.e., thermocompression bonding step).

The step of thermocompression bonding is not particularly limited, however, the method in which the heating body having the temperature from 80 to 140° C. is pressed against the laminated body of the infrared shielding sheet and the interlayer film is preferable. The heating body may have a plane surface or a curved surface, or it may be a roller. For thermocompression bonding, it is possible to use a plurality of heat rollers or pinching surfaces of the plane surfaces that can be heated, or to use them in combination. Also, the thermocompression bonding may be performed on both sides or only one side of the laminated body of the infrared shielding sheet and the interlayer film. In the latter case, one of the rollers or pinching surfaces for the thermocompression bonding is not needed to be heated. Among the above, as the method for manufacturing the interlayer film for laminated glass of the present invention, it is preferable to use the heat rollers in the thermocompression bonding step, and more preferably, to use the heated roller and the not-heated roller in combination.

Generally, the surface of the interlayer film is a rough surface that is treated by the embossing method and the like so that air can easily escape at the time of adhesion. Thus, the adhering surface becomes smooth according to the surface to be adhered so as to have a good optical performance, however, the other surface is needed to maintain the roughness to be adhered to the glass plate and the like. Therefore, out of the thermocompression bonding rollers, the roller making contact with the interlayer film preferably has a rough surface so that the surface roughness of the interlayer film is maintained. That is, it is preferable that at least one of the both surfaces of the interlayer film is embossed so that the embossed surface is laminated to make contact with the infrared shielding sheet of the present invention. Also, after the thermocompression bonding, the surface of the interlayer film that does not make contact with the infrared shielding sheet may be aggressively embossed.

The transparent support that is used for preparation of the infrared shielding sheet may be exfoliated before or after the step of heat-bonding, or may serve as a part of the interlayer film for laminated glass without exfoliation.

Figure 5:
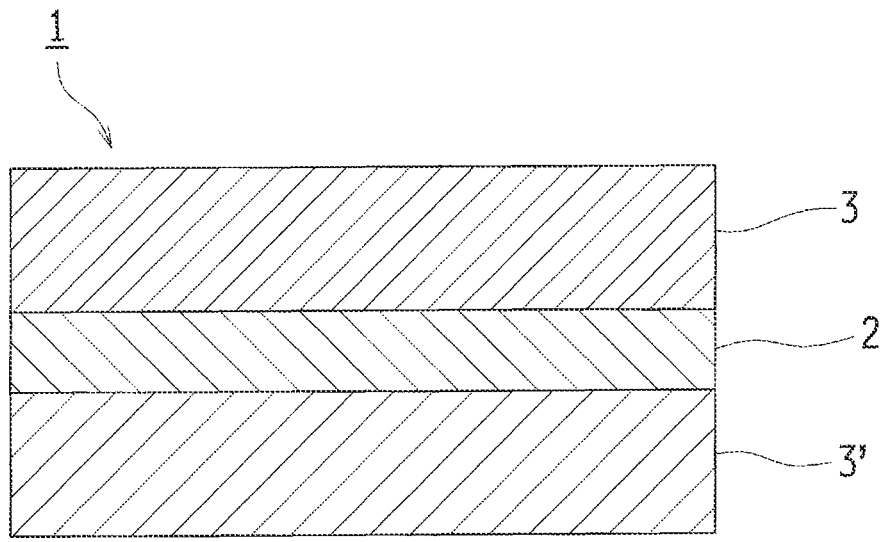
FIG. 5 is a cross-sectional view schematically showing an example of an interlayer film for laminated glass according to an embodiment of the present invention.

The method for manufacturing the interlayer film for laminated glass of the present invention preferably includes a step of laminating the second interlayer film on the opposite surface of the surface of the infrared shielding sheet on which the first interlayer film is laminated. That is, the interlayer film for laminated glass of the present invention preferably has the second interlayer film in addition to the first interlayer film. As shown in FIG. 5, the interlayer film for glass according to one aspect of the present invention includes an infrared shielding sheet 2 of the present invention, a first interlayer film 3 that is formed on one surface of the infrared shielding sheet 2, and a second interlayer film 3' that is formed on the other surface of the infrared shielding sheet 2. The infrared shielding sheet 2 and the second interlayer film 3' may be adjacent to each other, or may include another component layer therebetween. However, it is preferable that the infrared shielding sheet 2 and the second interlayer film 3' are adjacent to each other. Also, it is preferable that the second interlayer film and another component layer are thermocompressively bonded to the infrared shielding sheet in the same manner as the step of thermocompressively bonding the first interlayer film to the infrared shielding sheet.

When processing the interlayer film for laminated glass including the infrared shielding sheet and the interlayer film, it may be cut by a blade, laser, water jet or heating.

[Laminated Glass]

The laminated glass of the present invention is characterized in comprising the interlayer film for laminated glass of the present invention and a plurality of glass plates (e.g. two glass plates), in which the interlayer film for laminated glass is interposed between the plurality of glass plates (at least two glass plates). The laminated glass of the present invention may be appropriately cut to have a desired size.

The intended purpose of the laminated glass of the present invention is not particularly limited, however, preferably it is used as window glasses of a house or a vehicle. A window member of the present invention includes the laminated glass of the present invention.

The method for laminating the interlayer film for laminated glass with a first glass plate and a second glass plate is not particularly limited. The interlayer film for laminated glass may be interposed between the two glass plates using the public known method so that they are laminated with each other.

In the configuration of the laminated glass as the laminated body in which the interlayer film for laminated glass is interposed and held between the two glass plates, the members are laminated in the following order: the glass plate, the first interlayer film, the infrared shielding sheet, the second interlayer film and the glass plate.

Figure 6:
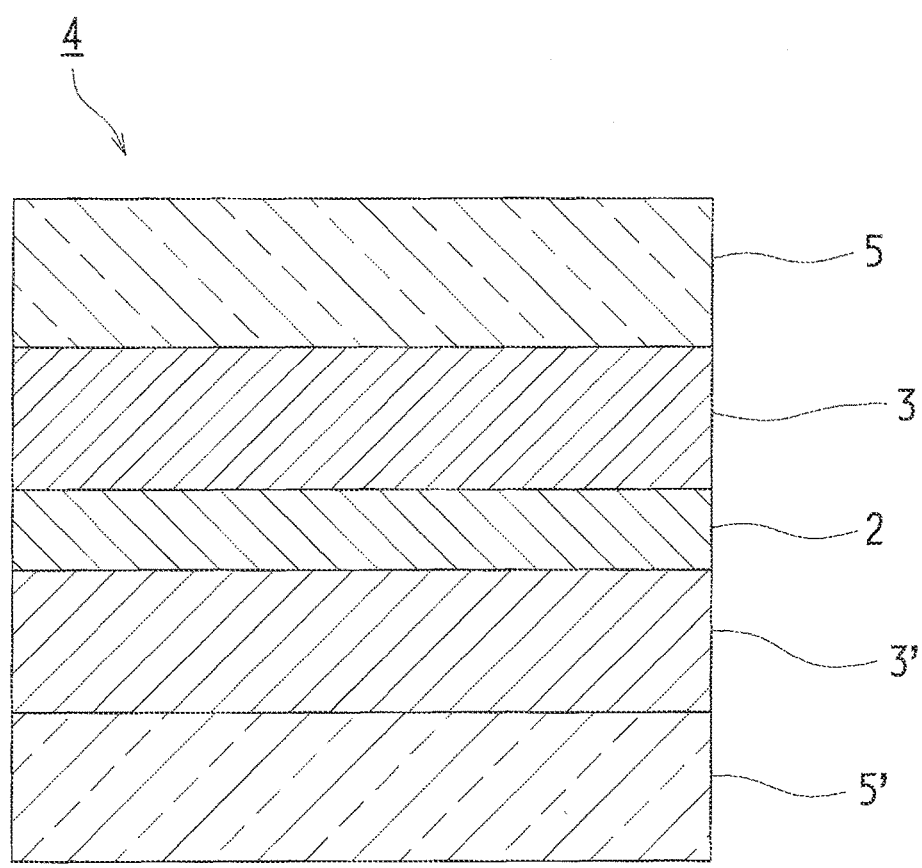
FIG. 6 is a cross-sectional view schematically showing one aspect of a laminated glass using the interlayer film for laminated glass according to FIG. 5.

FIG. 6 is a schematic view showing one aspect of the configuration of the laminated glass including the interlayer film for laminated glass interposed and held between the glass plates according to the present invention. The laminated glass according to one aspect of the present invention includes: the interlayer film for laminated glass (i.e., the first interlayer film 3, the infrared shielding sheet 2 and the second interlayer film 3') as shown in FIG. 5; and a plurality of glass plates 5 and 5'. The interlayer film for laminated glass is interposed between the plurality of glass plates 5 and 5' so that the glass plate 5 is adjacent to the first interlayer film 3 and the glass plate 5' is adjacent to the second interlayer film 3'.

The end edges of the infrared shielding sheet 2 may be inside the end edges of the glass plates 5 and 5' and the end edges of the first and second interlayer films 3 and 3'. Also, the end edges of the glass plates 5 and 5' and the end edges of the first and second interlayer films 3 and 3' may be located respectively on the same positions, or either of the end edges of the glass plates 5 and 5' or the end edges of the first and second interlayer film 3 and 3' may be protruded.

As shown in FIG. 6, in the laminated glass in which the interlayer film for glass (i.e., the laminated body made of the first interlayer film 3, the infrared shielding sheet 2 and the second interlayer film 3') is interposed and held between the glass plates 5 and 5', the end edges of the infrared shielding sheet 2 may be located at the same positions as the respective positions of the end edges of the glass plates 5 and 5' and the end edges of the interlayer films 3 and 3'. Alternatively, in the laminated glass, the end edges of the infrared shielding sheet 2 may be protruded from the end edges of the glass plates 5 and 5' and the end edges of the first and second interlayer films 3 and 3'.

In the interlayer film for glass (i.e., the laminated body made of the first interlayer film 3, the infrared shielding sheet 2 and the second interlayer film 3') interposed and held between the glass plates 5 and 5', the infrared shielding sheet 2 and the first interlayer film 3 may be adjacent to each other, and the infrared shielding sheet 2 and the second interlayer film 3' may be adjacent to each other. Alternatively, another component layer may be interposed between the infrared shielding sheet 2 and the first interlayer film 3, and between the infrared shielding sheet 2 and the second interlayer film 3'.

In the method for manufacturing the laminated glass of the present invention, the glass plate may be a glass not having the curvature, or may be a curved glass. Also, the two glass plates that sandwich and hold the interlayer film for laminated glass may have the different thicknesses, and may be colored. Particularly, when the laminated glass is used, for example, as a windshield of a vehicle for the purpose of heat insulation, a colored component as a metal may be mixed in the glass plate within the range in which the visible light transmittance of the laminated glass is not less than 70% that is required under JIS R 3211. Generally, the heat insulation property can be effectively improved by the use of a green colored glass as the glass plate. As to the color consistency of the green colored glass, it is preferable to adapt the color consistency to the desired consistency by adjusting the amount of the metal component to be added or adjusting the thickness of the glass.

The method for manufacturing the laminated glass of the present invention preferably includes a step of thermocompressivley bonding the interlayer film for laminated glass of the present invention that is interposed and held between the glass plates.

The glass plates and the interlayer film for glass of the present invention that is interposed and held between the glass plates are compressively bonded preliminarily, for example, at the temperature of 80 to 120° C. during 30 to 60 minutes under the reduced pressure using a vacuum bag and the like. Then, they are bonded to each other in an autoclave under the increased pressure of 1.0 to 1.5 MPa at the temperature of 120 to 150° C., thus the laminated glass with the interlayer film for the glass being interposed between the two glass plates are manufactured.

After completion of the thermocompression bonding, a cooling manner is not particularly limited. The laminated glass may be obtained by suitably releasing the pressure while cooling. In the method for manufacturing the laminated glass of the present invention, it is preferable to lower the temperature while maintaining the pressure after completion of the thermocompression bonding in terms of further reducing wrinkles or cracks of the obtained laminated glass.

The method for manufacturing the laminated glass of the present invention preferably includes a step of releasing the pressure successively after lowering the temperature while maintaining the pressure. Specifically, it is preferable that when the temperature in the autoclave becomes 40° C. or less after lowering the temperature while maintaining the pressure, then the pressure is released to lower the temperature.

EXAMPLES

Hereinafter, the present invention is further described in details with reference to the following Examples. In the Examples and Comparative Examples, the term "part(s)" means "part(s) by weight".

Example 1

(Preparation of High Refractive Index Resin Layer A)

In 4 parts of methyl ethyl ketone (herein after referred to as "MEK") as the solvent, 0.4 part of dipentaerythritol hexaacrylate (trade name: "KAYARAD® DPHA" manufactured by Nippon Kayaku Co., Ltd., hereinafter simply referred to as "KAYARAD® DPHA") as the resin binder and 0.05 part of 1-hydroxycyclohexyl phenyl ketone (trade name: "IRGACURE® 184", photopolymerization initiator, manufactured by BASF Japan Ltd., hereinafter simply referred to as "IRGACURE® 184") were dissolved. In the obtained solution, 4.7 parts of zirconium oxide fine particles (trade name: "NANON5 ZR-010", with the average primary particle size of 7 to 8 nm, the average dispersed particle size of 15 nm and the solid component concentration of 30 wt %, manufactured by SOLAR CO., Ltd., dispersion medium: MEK) were dispersed. Thus, an application liquid A of the high refractive index resin for forming a high refractive index resin layer A (i.e., dispersion liquid prepared by dissolving the resin binder and dispersing the fine particles in the solvent) was prepared.

Next, the application liquid A of the high refractive index resin was applied on a PET base material by a wire bar coater. After it was dried for two minutes at 100° C. for evaporating the MEK, the high refractive index resin layer A was prepared by ultraviolet (hereinafter referred to as "UV") irradiation. The content of the fine particles in the high refractive index resin layer A was 76 wt % based on the total high refractive index resin layer A. The respective refractive indexes of the prepared high refractive index resin layer A at the wavelength of 550 nm and of 1200 nm were measured by a spectroscopic ellipsometer (trade name: "M-2000", manufactured by J.A. Woollam (Japan) Co., Inc.) to obtain a value Δn by subtracting the refractive index at the wavelength of 1200 nm from the refractive index at the wavelength of 550 nm. The surface resistance of the prepared high refractive index resin layer A was measured by a surface resistance meter (trade names "Hiresta® UP" and "Loresta® GP", manufactured by Mitsubishi Chemical Analytech Co., Ltd.).

(Preparation of Low Refractive Index Resin Layer A)

To 7 parts of toluene as the solvent, the following were added and dispersed: 1.4 parts of tin-doped indium oxide fine particles as non-hollow fine particles (trade name: "ITO-R", manufactured by CIK Nano Tek Corportion) with the average primary particle size of 25.6 nm, the powder resistivity of 0.8 Ω·cm when compressed at 60 MPa; 0.4 part of KAYARAD® DPHA; 0.05 part of IRGACURE® 184; and 0.3 part of an aminoalkyl methacrylate copolymer dispersant (trade name: "DISPERBYK®-167", manufactured by BYK Japan KK, hereinafter occasionally referred to as the "aminoalkyl methacrylate copolymer dispersant"). The dispersion was performed at the peripheral speed of 10 m/s using the bead mill. Thus, an application liquid A of the low refractive index resin for forming a low refractive index resin layer A (i.e., dispersion liquid prepared by dissolving the resin binder and dispersing the fine particles in the solvent) was prepared. The tin-doped indium oxide fine particles had the average dispersed particle size of 40 nm.

Next, the application liquid A of the low refractive index resin was applied on a PET base material by the wire bar coater. After it was dried for two minutes at 100° C. for evaporating toluene, the low refractive index resin layer A was prepared by the UV irradiation. The content of the fine particles in the low refractive index resin layer A was 65 wt % based on the total low refractive index resin layer A. The respective refractive indexes of the prepared low refractive index resin layer A at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared low refractive index resin layer A was measured in the same way as the measurement of the surface resistance of the high refractive index resin layer A.

(Preparation of Laminated Film)

The wavelength of the light reflected by the laminated film was set to 1200 nm. The optical thickness of each high refractive index resin layer A at the wavelength of 1200 nm was set to 300 nm, and the optical thickness of each low refractive index resin layer A at the wavelength of 1200 nm was set to 300 nm. Under the above conditions, the low refractive index resin layer A and the high refractive index resin layer A were alternately laminated, in this order (i.e., the order of which the low refractive index resin layer A makes contact with the PET base material), on the PET base material as the transparent support having the thickness of 100 μm (trade name: "COSMOSHINE® A4100", manufactured by Toyobo Co., Ltd., hereinafter occasionally referred to as "PET base material"). Thus, an infrared shielding sheet according to one example of the present invention, having 8 layers as the total of the high refractive index resin layers and the low refractive index resin layers, was prepared. The respective low refractive index resin layers A were prepared by the method described in the above (Preparation of Low Refractive Index Resin Layer A), and the respective high refractive index resin layers A were prepared by the method described in the above (Preparation of High Refractive Index Resin Layer A).

Example 2

(Preparation of High Refractive Index Resin Layer B)

To 7 parts of toluene, the following were added and dispersed: 1.4 parts of titanium oxide fine particles (trade name: "TTO-51 A", manufactured by ISHIHARA SANGYO KAISHA, LTD.) with the average primary particle size of 35 nm; 0.4 part of KAYARAD DPHA; 0.05 part of 2-methyl-1-[4-(methylthio)phenyl]-2-morpholinopropan-1-one ("IRGACURE® 907" manufactured by BASF Japan Ltd.); and 0.3 part of a dispersant (trade name: "DISPERBYK®-2001", manufactured by BYK Japan KK). The dispersion was performed at the peripheral speed of 10 m/s using the bead mill. Thus, an application liquid B of the high refractive index resin for forming a high refractive index resin layer B was prepared. The titanium oxide fine particles had the average dispersed particle size of 45 nm.

Next, the application liquid B of the high refractive index resin was applied on a PET base material by the wire bar coater. After it was dried for two minutes at 100° C. for evaporating toluene, the high refractive index resin layer B was prepared by the UV irradiation. The content of the fine particles in the high refractive index resin layer B was 65 wt % based on the total high refractive index resin layer B. The respective refractive indexes of the prepared high refractive index resin layer B at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared high refractive index resin layer B was measured in the same way as the measurement of the surface resistance of the high refractive index resin layer A of Example 1.

(Preparation of Laminated Film)

The wavelength of the light reflected by the laminated film was set to 1200 nm. The optical thickness of each high refractive index resin layer B at the wavelength of 1200 nm was set to 300 nm, and the optical thickness of each low refractive index resin layer A at the wavelength of 1200 nm was set to 300 nm. Under the above conditions, the high refractive index resin layer B and the low refractive index resin layer A were alternately laminated, in this order (i.e., the order of which the high refractive index resin layer B makes contact with the PET base material), on the same PET base material as that used for preparation of the laminated film of Example 1. Thus, an infrared shielding sheet according to one example of the present invention, having 7 layers as the total of the high refractive index resin layers and the low refractive index resin layers, was prepared. The respective high refractive index resin layers B were prepared by the method described in the above (Preparation of High Refractive Index Resin Layer B) of this Example, and the respective low refractive index resin layers A were prepared by the method described in the above (Preparation of Low Refractive Index Resin Layer A) of Example 1.

Example 3

(Preparation of High Refractive Index Resin Layer C)

To 7 parts of toluene, the following were added and dispersed: 1.4 parts of lanthanum hexaboride fine particles (manufactured by Wako Pure Chemical Industries, Ltd.) with the average primary particle size of 1 to 2 μm; 0.4 part of KAYARAD® DPHA; 0.05 part of IRGACURE 184; and 0.3 part of the aminoalkyl methacrylate copolymer dispersant. The dispersion was performed at the peripheral speed of 10 m/s using the bead mill. The obtained dispersion was subjected to the centrifugal treatment at the rotational speed of 5000 rpm for 15 minutes using a centrifuge ("Himac® CR18", manufactured by Hitachi Koki Co., Ltd.). Thus, an application liquid C of the high refractive index resin for forming a high refractive index resin layer C was prepared. The lanthanum hexaboride fine particles had the average dispersed particle size of 35 nm.

Next, the application liquid C of the high refractive index resin was applied on a PET base material by the wire bar coater. After it was dried for two minutes at 100° C. for evaporating toluene, the high refractive index resin layer C was prepared by the UV irradiation. The content of the fine particles in the high refractive index resin layer C was 65 wt % based on the total high refractive index resin layer C. The respective refractive indexes of the prepared high refractive index resin layer C at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared high refractive index resin layer C was measured in the same way as the measurement of the surface resistance of the high refractive index resin layer A of Example 1.

(Preparation of Laminated Film)

The wavelength of the light reflected by the laminated film was set to 1200 nm. The optical thickness of the high refractive index resin layer C at the wavelength of 1200 nm was set to 300 nm, the optical thickness of each high refractive index resin layer A at the wavelength of 1200 nm was set to 300 nm, and the optical thickness of each low refractive index resin layer A at the wavelength of 1200 nm was set to 300 nm. Under the above conditions, the high refractive index resin layer C, the low refractive index resin layer A and the high refractive index resin layer A were laminated, in the following order: the high refractive index resin layer C; the low refractive index resin layer A; the high refractive index resin layer A; the low refractive index resin layer A; and the high refractive index resin layer A (i.e., the order of which the high refractive index resin layer C makes contact with the PET base material), on the same PET base material as that used for preparation of the laminated film of Example 1. Thus, an infrared shielding sheet according to one example of the present invention, having 5 layers as the total of the high refractive index resin layers and the low refractive index resin layers, was prepared. The high refractive index resin layer C was prepared by the method described in the above (Preparation of High Refractive Index Resin Layer C) of this Example. The respective low refractive index resin layers A were prepared by the method described in the above (Preparation of Low Refractive Index Resin Layer A) of Example 1, and the respective high refractive index resin layers A were prepared by the method described in the above (Preparation of High Refractive Index Resin Layer A) of Example 1.

Example 4

(Preparation of High Refractive Index Resin Layer D)

A high refractive index resin layer D was prepared in the same way as described in the above (Preparation of High Refractive Index Resin Layer B) of Example 2 except that nanodiamonds (diamond fine particles with the average primary particle size of 3.5 nm and the average dispersed particle size of 4.5 nm) were used as the fine particles in place of the titanium oxide fine particles. The content of the fine particles in the high refractive index resin layer D was 65 wt % based on the total high refractive index resin layer D. The respective refractive indexes of the prepared high refractive index resin layer D at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared high refractive index resin layer D was measured in the same way as the measurement of the surface resistance of the high refractive index resin layer A of Example 1.

(Preparation of Laminated Film)

The wavelength of the light reflected by the laminated film was set to 1200 nm. The optical thickness of each high refractive index resin layer D at the wavelength of 1200 nm was set to 300 nm, and the optical thickness of each low refractive index resin layer A at the wavelength of 1200 nm was set to 300 nm. Under the above conditions, the low refractive index resin layer A and the high refractive index resin layer D were alternately laminated, in this order (i.e., the order of which the low refractive index resin layer A makes contact with the PET base material), on the same PET base material as that used for preparation of the laminated film of Example 1. Thus, an infrared shielding sheet according to one example of the present invention, having 8 layers as the total of the high refractive index resin layers and the low refractive index resin layers, was prepared. The respective low refractive index resin layers A were prepared by the method described in the above (Preparation of Low Refractive Index Resin Layer A) of Example 1, and the respective high refractive index resin layers D were prepared by the method described in the above (Preparation of High Refractive Index Resin Layer D) of this Example.

Example 5

(Preparation of Low Refractive Index Resin Layer B)

To the application liquid A of the low refractive index resin prepared by the method described in the above (Preparation of Low Refractive Index Resin Layer A) of Example 1, 3 parts of hollow silica fine particles (trade name: "THRULYA 1110" with the average primary particle size of 50 nm and solid content concentration of 20 wt %, manufactured by JGC Catalysts and Chemicals Ltd., dispersion medium: methyl isobutyl ketone) were added. Thus, an application liquid B of the low refractive index resin for forming a low refractive index resin layer B was prepared.

Next, the application liquid B of the low refractive index resin was applied on a PET base material by the wire bar coater. After it was dried for two minutes at 100° C. for evaporating toluene and methyl isobutyl ketone, the low refractive index resin layer B was prepared by the UV irradiation. The content of the fine particles in the low refractive index resin layer B was 73 wt % based on the total low refractive index resin layer B. The respective refractive indexes of the prepared low refractive index resin layer B at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared low refractive index resin layer B was measured in the same way as the measurement of the surface resistance of the high refractive index resin layer A of Example 1.

(Preparation of Laminated Film)

The wavelength of the light reflected by the laminated film was set to 1200 nm. The optical thickness of each high refractive index resin layer A at the wavelength of 1200 nm was set to 300 nm, and the optical thickness of each low refractive index resin layer B at the wavelength of 1200 nm was set to 300 nm. Under the above conditions, the low refractive index resin layer B and the high refractive index resin layer A were alternately laminated, in this order (i.e., the order of which the low refractive index resin layer B makes contact with the PET base material), on the same PET base material as that used for preparation of the laminated film of Example 1. Thus, an infrared shielding sheet according to one example of the present invention, having 8 layers as the total of the high refractive index resin layers and the low refractive index resin layers, was prepared. The respective low refractive index resin layers B were prepared by the method described in the above (Preparation of Low Refractive Index Resin Layer B) of this Example, and the respective high refractive index resin layers A were prepared by the method described in the above (Preparation of High Refractive Index Resin Layer A) of Example 1.

Example 6

(Example of Synthesis of Infrared Absorption Pigment)

To 120 parts of sulfolane, 15.9 parts of naphtalic anhydride, 29 parts of urea, 0.40 part of ammonium molybdate and 3.5 parts of vanadyl (V) chloride were added. The temperature of the obtained mixture was increased to 200° C. to react the mixture for 11 hours at the 200° C. After completion of the reaction, the temperature of the mixture after reaction was decreased to 65° C., then 100 parts of N,N-dimethylformamide (hereinafter referred to as "DMF") was added so that a solid deposit was filtered and separated. Thus, the obtained solid was washed by 50 parts of DMF to obtain 20.3 parts of wet cake. The obtained wet cake was added to 100 parts of DMF, then the temperature of the mixture was increased to 80° C. so as to be stirred for 2 hours at 80° C. The solid deposit was filtered and separated, then washed by 200 parts of water, thus 18.9 parts of wet cake was obtained. The obtained wet cake was added to 150 parts of water, then the temperature of the mixture was increased to 90° C. so as to be stirred for 2 hours at 90° C. The solid deposit was filtered and separated, then washed by 200 parts of water, thus 16.1 parts of wet cake was obtained. The obtained wet cake was dried at 80° C., thus 12.3 parts of an infrared absorption coloring matter was obtained.

(Preparation of High Refractive Index Resin Layer E)

The above synthesized infrared absorption coloring matter in an amount of 0.03 parts was dispersed in the application liquid A of the high refractive index resin that was prepared by the method described in the above (Preparation of High Refractive Index Resin Layer A) of Example 1, thus an application liquid E of the high refractive index resin for forming a high refractive index resin layer E was prepared.

Next, the application liquid E of the high refractive index resin was applied on a PET base material by the wire bar coater. After it was dried for two minutes at 100° C. for evaporating toluene, the high refractive index resin layer E was prepared by the UV irradiation. The content of the fine particles in the high refractive index resin layer E was 76 wt % based on the total high refractive index resin layer E. The respective refractive indexes of the prepared high refractive index resin layer E at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared high refractive index resin layer E was measured in the same way as the measurement of the surface resistance of the high refractive index resin layer A of Example 1.

(Preparation of Low Refractive Index Resin Layer C)

The above synthesized infrared absorption coloring matter in an amount of 0.03 parts was dispersed in the application liquid A of the low refractive index resin that was prepared by the method described in the above (Preparation of Low Refractive Index Resin Layer A) of Example 1, thus an application liquid C of the low refractive index resin for forming a low refractive index resin layer C was prepared.

Next, the application liquid C of the low refractive index resin was applied on a PET base material by the wire bar coater. After it was dried for two minutes at 100° C. for evaporating toluene, the low refractive index resin layer C was prepared by the UV irradiation. The content of the fine particles in the low refractive index resin layer C was 66 wt % based on the total low refractive index resin layer C. The respective refractive indexes of the prepared low refractive index resin layer C at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared low refractive index resin layer C was measured in the same way as the measurement of the surface resistance of the high refractive index resin layer A of Example 1.

(Preparation of Laminated Film)

The wavelength of the light reflected by the laminated film was set to 1200 nm. The optical thickness of each high refractive index resin layer E at the wavelength of 1200 nm was set to 300 nm, and the optical thickness of each low refractive index resin layer C at the wavelength of 1200 nm was set to 300 nm. Under the above conditions, the low refractive index resin layer C and the high refractive index resin layer E were alternately laminated, in this order (i.e., the order of which the low refractive index resin layer C makes contact with the PET base material), on the same PET base material as that used for preparation of the laminated film of Example 1. Thus, an infrared shielding sheet according to one example of the present invention, having 8 layers as the total of the high refractive index resin layers and the low refractive index resin layers, was prepared. The respective low refractive index resin layers C were prepared by the method described in the above (Preparation of Low Refractive Index Resin Layer C) of this Example, and the respective high refractive index resin layers E were prepared by the method described in the above (Preparation of High Refractive Index Resin Layer E) of this Example.

Example 7

(Preparation of Cholesteric Liquid Crystal Film)

To 26 parts of cyclopentanone, the following were added: 10 parts of LC-242 (rod-like liquid crystal compound, manufactured by BASF Japan Ltd); 0.25 part of LC-756 (chiral agent, manufactured by BASF Japan Ltd); and 0.5 part of 2,4,6-trimethylbenzoyl-diphenylphosphine oxide (trade name "LUCIRIN® TPO", polymerization initiator, manufactured by BASF Japan Ltd). Thus, an application liquid A of the liquid crystal was prepared.

Also, an application liquid B of the liquid crystal was prepared in the same way as preparation of the application liquid A of the liquid crystal except that the amount of LC-756 in the application liquid A of the liquid crystal was changed to 0.3 part.

The application liquid A of the liquid crystal was applied on the same PET base material as used for preparation of the laminated film of Example 1 by the wire bar coater, so that the application liquid A of the liquid crystal had the geometric thickness of 4 μm. After it was dried for two minutes at 130° C. for evaporating cyclopentanone, a first cholesteric liquid crystal film was prepared by the UV irradiation. Furthermore, the application liquid B of the liquid crystal was applied on the first cholesteric liquid crystal film by the wire bar coater, so that the application liquid B of the liquid crystal had the geometric thickness of 4 μm. After it was dried for two minutes at 130° C. for evaporating cyclopentanone, a second cholesteric liquid crystal film was prepared by the UV irradiation.

The wavelength of the light reflected by the laminated film was set to 1200 nm. The optical thickness of each high refractive index resin layer A at the wavelength of 1200 nm was set to 300 nm, and the optical thickness of each low refractive index resin layer A at the wavelength of 1200 nm was set to 300 nm. Under the above conditions, the low refractive index resin layer A and the high refractive index resin layer A were alternately laminated, in this order (i.e., the order of which the low refractive index resin layer A makes contact with the PET base material), on the cholesteric liquid crystal film prepared as described above. Thus, an infrared shielding sheet according to one example of the present invention, having 6 layers as the total of the high refractive index resin layers and the low refractive index resin layers, was prepared. The respective low refractive index resin layers A were prepared by the method described in the above (Preparation of Low Refractive Index Resin Layer A) of Example 1, and the respective high refractive index resin layers A were prepared by the method described in the above (Preparation of High Refractive Index Resin Layer A) of Example 1.

Example 8

An infrared shielding sheet according to one example of the present invention was prepared in the same way as Example 7 except that a birefringence multilayer film (trade name: "Nano 90S", manufactured by Sumitomo 3M Ltd.) was used in place of the two-layered cholesteric liquid crystal films.

Example 9

To 7 parts of 1-methoxy-2-propanol (hereinafter referred to as "PGM") as the solvent, the following were added and dispersed: 1.4 parts of tin-doped indium oxide fine particles as non-hollow fine particles (trade name: "ITO-R", manufactured by CIK Nano Tek Corportion) with the average primary particle size of 25.6 nm, the powder resistivity of 0.8 Ω·cm when compressed at 60 MPa; 0.04 part of KAYARAD® DPHA; 0.01 part of 2,4,6-trimethylbenzoyl-diphenylphosphine oxide (trade name "LUCIRIN® TPO", polymerization initiator, manufactured by BASF Japan Ltd); and 0.06 part of the aminoalkyl methacrylate copolymer dispersant (trade name: "DISPERBYK®-167", manufactured by BYK Japan KK). The dispersion was performed at the peripheral speed of 10 m/s using the bead mill. Thus, an application liquid D of the low refractive index resin for forming a low refractive index resin layer D was prepared. The tin-doped indium oxide fine particles had the average dispersed particle size of 40 nm.

Next, the application liquid D of the low refractive index resin was applied on a PET base material by the wire bar coater. After it was dried for two minutes at 100° C. for evaporating PGM, the low refractive index resin layer D was prepared by the UV irradiation. The content of the fine particles in the low refractive index resin layer D was 93 wt % based on the total low refractive index resin layer D. The respective refractive indexes of the prepared low refractive index resin layer D at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared low refractive index resin layer D was measured in the same way as the measurement of the surface resistance of the high refractive index resin layer A.

(Preparation of Laminated Film)

The wavelength of the light reflected by the laminated film was set to 1200 nm. The optical thickness of each high refractive index resin layer B at the wavelength of 1200 nm was set to 300 nm, and the optical thickness of each low refractive index resin layer D at the wavelength of 1200 nm was set to 300 nm. Under the above conditions, the low refractive index resin layer D and the high refractive index resin layer B were alternately laminated, in this order (i.e., the order of which the low refractive index resin layer D makes contact with a PET base material), on the PET base material as the transparent support having the thickness of 100 μm (trade name: "COSMOSHINE® A4100", manufactured by Toyobo Co., Ltd.). Thus, an infrared shielding sheet according to one example of the present invention, having 6 layers as the total of the high refractive index resin layers and the low refractive index resin layers, was prepared. The respective low refractive index resin layers D were prepared by the method described in the above (Preparation of Low Refractive Index Resin Layer D), and the respective high refractive index resin layers B were prepared by the method described in the above (Preparation of High Refractive Index Resin Layer B) of Example 2.

Comparative Example 1

(Preparation of Low Refractive Index Resin Layer E)

In a solution prepared by solving 1 part of KAYARAD® DPHA and 0.01 part of IRGACURE® 184 in 10 parts of MEK, 3.8 parts of silicon oxide fine particles (trade name: "MEK-ST", with the average dispersed particle size of 15 nm, manufactured by Nissan Chemical Industries, Ltd.) were dispersed. Thus, an application liquid E of the low refractive index resin for forming a low refractive index resin layer E was prepared.

Next, the application liquid E of the low refractive index resin was applied on a PET base material by the wire bar coater. After it was dried for two minutes at 100° C. for evaporating MEK, the low refractive index resin layer E was prepared by the UV irradiation. The respective refractive indexes of the prepared low refractive index resin layer E at the wavelength of 550 nm and of 1200 nm were measured by the spectroscopic ellipsometer (trade name: "M-2000", manufactured by J.A. Woollam (Japan) Co., Inc.) to obtain the value Δn by subtracting the refractive index at the wavelength of 1200 nm from the refractive index at the wavelength of 550 nm. The surface resistance of the prepared low refractive index resin layer E was measured in the same way as the measurement of the surface resistance of the high refractive index resin layer A.

(Preparation of Laminated Film)

The wavelength of the light reflected by the laminated film was set to 1200 nm. The optical thickness of each high refractive index resin layer A at the wavelength of 1200 nm was set to 300 nm, and the optical thickness of each low refractive index resin layer E at the wavelength of 1200 nm was set to 300 nm. Under the above conditions, the high refractive index resin layer A and the low refractive index resin layer E were alternately laminated, in this order (i.e., the order of which the high refractive index resin layer A makes contact with the PET base material), on the same PET base material as that used for preparation of the laminated film of Example 1. Thus, an infrared shielding sheet as a comparative example, having 7 layers as the total of the high refractive index resin layers A and the low refractive index resin layers E, was prepared. The respective high refractive index resin layers A were prepared by the method described in the above (Preparation of High Refractive Index Resin Layer A) of Example 1.

The visible light transmittance, the haze and the total solar transmittance (Tts) of the respective infrared shielding sheets of Examples 1 to 9 and Comparative Example 1 were measured by the methods described below.

(Measurement of Visible Light Transmittance of Infrared Shielding Sheet)

The visible light transmittance of each of the obtained infrared shielding sheets at the wavelengths from 380 to 780 nm was measured in conformity to JIS R 3106 using a spectrophotometer (trade name: "UV-3100" manufactured by SHIMADZU CORPORATION).

resin layer (referred to as "low refractive layer" in the Table) respectively at the wavelength of 550 nm; the respective refractive indexes (each referred to as "n (1200 nm)" in the Table) of the above resin layers respectively at the wavelength of 1200 nm; the value Δn obtained by subtracting the refractive index at the wavelength of 1200 nm from the refractive index at the wavelength of 550 nm; and the surface resistance. Note that in the case where the infrared shielding sheet contains a plurality kinds of high refractive index resin layers, the properties (the refractive index, the value Δn obtained by subtracting the refractive index at the wavelength of 1200 nm from the refractive index at the wavelength of 550 nm, and the surface resistance) of only the high refractive index resin layer making contact with the PET base material are indicated in Table 1.

TABLE 1

|  | Visible Light Trans- mittance | Haze | Tts | High Refractive Layer n(550 nm) High Refractive Layer n(1200 nm) | High Refractive Layer Δn | High Refractive Layer Surface Resistance | Low Refractive Layer n (550 nm) Low Refractive Layer n(1200 nm) | Low Refractive Layer Δn | Low Refractive Layer Surface Resistance |
|---|---|---|---|---|---|---|---|---|---|
| Example 1 | 87.10% | 0.4% | 72.70% | 1.75 / 1.72 | 0.03 | $1 \times 10^{13} \Omega/\square$ | 1.64 / 1.33 | 0.31 | $1 \times 10^{7} \Omega/\square$ |
| Example 2 | 82.70% | 0.4% | 69.70% | 1.88 / 1.83 | 0.05 | $1 \times 10^{13} \Omega/\square$ | 1.64 / 1.33 | 0.31 | $1 \times 10^{7} \Omega/\square$ |
| Example 3 | 77.90% | 0.5% | 63.60% | 1.62 / 1.90 | −0.28 | $1 \times 10^{10} \Omega/\square$ | 1.64 / 1.33 | 0.31 | $1 \times 10^{7} \Omega/\square$ |
| Example 4 | 86.50% | 0.4% | 71.50% | 1.70 / 1.68 | 0.02 | $1 \times 10^{10} \Omega/\square$ | 1.64 / 1.33 | 0.31 | $1 \times 10^{7} \Omega/\square$ |
| Example 5 | 87.00% | 0.4% | 70.00% | 1.75 / 1.72 | 0.03 | $1 \times 10^{13} \Omega/\square$ | 1.58 / 1.30 | 0.28 | $1 \times 10^{10} \Omega/\square$ |
| Example 6 | 79.30% | 0.4% | 58.30% | 1.75 / 1.72 | 0.03 | $1 \times 10^{13} \Omega/\square$ | 1.64 / 1.33 | 0.31 | $1 \times 10^{7} \Omega/\square$ |
| Example 7 | 85.00% | 0.4% | 66.20% | 1.75 / 1.72 | 0.03 | $1 \times 10^{13} \Omega/\square$ | 1.64 / 1.33 | 0.31 | $1 \times 10^{7} \Omega/\square$ |
| Example 8 | 82.20% | 0.5% | 50.90% | 1.75 / 1.72 | 0.03 | $1 \times 10^{13} \Omega/\square$ | 1.64 / 1.33 | 0.31 | $1 \times 10^{7} \Omega/\square$ |
| Example 9 | 83.9% | 0.3% | 65.7% | 1.88 / 1.83 | 0.05 | $1 \times 10^{13} \Omega/\square$ | 1.66 / 1.15 | 0.46 | $1 \times 10^{6} \Omega/\square$ |
| Comparative Example 1 | 90.60% | 0.5% | 84.70% | 1.75 / 1.72 | 0.03 | $1 \times 10^{13} \Omega/\square$ | 1.48 / 1.48 | 0.00 | $1 \times 10^{13} \Omega/\square$ |

(Measurement of Total Solar Transmittance (Tts) of Infrared Shielding Sheet)

The total solar transmittance (Tts) is a scale for indicating how much energy of the thermal energy from the sun (total solar energy) transmits the material as the measurement object. The total solar transmittance (Tts) of the infrared shielding sheet was calculated by the measurement method and the calculation formula defined by ISO 13837. As the calculated value of the total solar transmittance of the infrared shielding sheet is decreased, the total solar energy transmitting the infrared shielding sheet is decreased, which indicates the high heat-ray shielding property of the infrared shielding sheet.

(Measurement of Haze of Infrared Shielding Sheet)

The haze of each of the obtained infrared shielding sheets was measured in conformity to JIS K 6714 using a haze meter (trade name: "TC-H III DPK" manufactured by Tokyo Denshoku Co., Ltd.).

Table 1 below indicates the following measurement results of the infrared shielding sheets of Examples 1 to 9 and Comparative Example 1; the visible light transmittance; the haze, the total solar transmittance; the respective refractive indexes (each referred to as "n (550 nm)" in the Table) of the high refractive index resin layer (referred to as "high refractive layer" in the Table) and the low refractive index The spectral transmittance and the spectral reflectance of each infrared shielding sheet of Example 1 and Comparative Example 1 at the wavelengths from 300 to 2500 nm were measured in conformity to JIS R 3106 using the spectrophotometer (trade name: "UV-3100" manufactured by SHIMADZU CORPORATION). The measurement results are shown in FIGS. 1 and 2.

Figure 2:
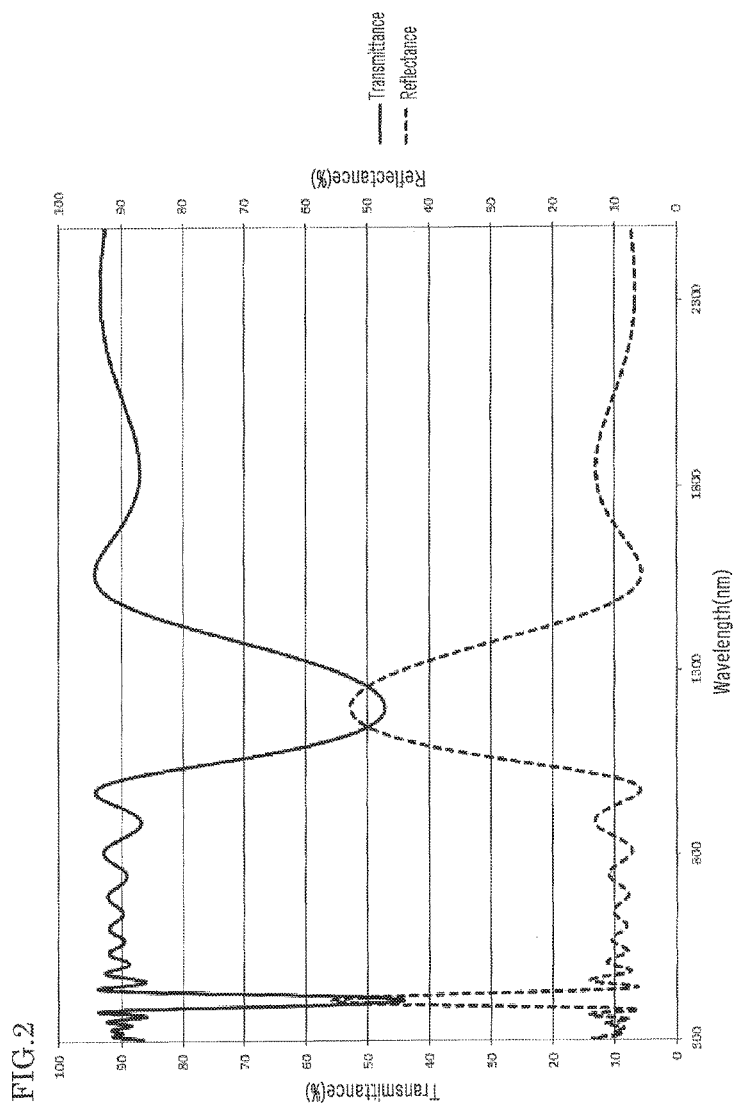
FIG. 2 is a graph showing the refractive index and the reflectance of an infrared shielding sheet according to Comparative Example 1 plotted against wavelength.

It can be seen from FIGS. 1 and 2, and Table 1 that the infrared shielding sheet according to Example 1 of the present invention includes the low refractive index resin layer having the value of 0.1 or more (specifically, 0.31) obtained by subtracting the refractive index at an arbitrary wavelength from 780 to 2500 nm (specifically, at the wavelength of 1200 nm) from the refractive index at the wavelength of 550 nm. Thus, compared with the infrared shielding sheet of Comparative Example 1 all of whose low refractive index resin layers have the value less than 0.1 (specifically, 0.00) obtained by subtracting the refractive index at an arbitrary wavelength from 780 to 2500 nm (specifically, at the wavelength of 1200 nm) from the refractive index at the wavelength of 550 nm, the infrared shielding sheet according to Example 1 of the present invention effectively reflects the infrared rays in the wavelength region from 780 to 1500 nm while absorbing the infrared rays in the wavelength region from 1500 to 2500 nm. Thus, the total solar transmittance (Tts) is remarkably improved.

In the infrared shielding sheet of Example 2, the layer containing the titanium oxide fine particles (the high refractive index resin layer B) that is used as each high refractive index resin layer has the high refractive index at the wavelength in the infrared region (wavelength of 1200 nm) and has a large difference in the refractive index between the low refractive index resin layer at the wavelength in the infrared region, compared with the layer containing the zirconium oxide fine particles (the high refractive index resin layer A) that is used as each high refractive index resin layer of the infrared shielding sheet of Example 1. Thus, the infrared shielding sheet of Example 2 further effectively blocks the infrared rays compared with the infrared shielding sheet of Example 1 (i.e., the total solar transmittance is improved).

In the infrared shielding sheet of Example 3, in addition to the infrared absorption by the lanthanum hexaboride fine particles, the layer containing the lanthanum hexaboride fine particles that is disposed so as to make contact with the PET base material (i.e., the high refractive index resin layer C) has the high refractive index at the wavelength in the infrared region (wavelength of 1200 nm) and has a large difference in the refractive index between the low refractive index resin layer at the wavelength in the infrared region, compared with the layer containing the zirconium oxide fine particles (the high refractive index resin layer A) that is disposed so as to make contact with the PET base material in the infrared shielding sheet of Example 1. Thus, the infrared shielding sheet of Example 3 further effectively blocks the infrared rays compared with the infrared shielding sheet of Example 1 (i.e., the total solar transmittance is improved).

In the infrared shielding sheet of Example 5, the wavelength absorbed by the low refractive index resin layer containing the tin-doped indium oxide fine particles (ITO) could be lowered by adding the hollow fine particles to the infrared shielding sheet of Example 1, almost without changing the refractive index of the infrared rays by the low refractive index resin layer. Thus, compared with the infrared shielding sheet of Example 1, the total solar transmittance (Tts) is improved.

In the infrared shielding sheets of Examples 6 to 8, the laminated film used in the infrared shielding sheet of Example 1 was combined, respectively, with the infrared absorption coloring matter, the cholesteric liquid crystal film and the birefringence multilayer film. This enables these infrared shielding sheets to further effectively block the infrared rays, while maintaining the visible light transmittance, compared with the infrared shielding sheet of Example 1 (i.e., the total solar transmittance was improved).

In the infrared shielding sheet of Example 9, the content of the fine particles in the low refractive index resin layer was in the range from 90 to 95 wt % (more specifically, 93 wt %). Thus, the infrared shielding sheet further effectively blocks the infrared rays, while maintaining the visible light transmittance, compared with the infrared shielding sheet of Example 2 (i.e., the total solar transmittance is improved).

As shown in FIG. 2, in the infrared shielding sheet of Comparative Example 1, the fine particles do not absorb the infrared rays (in the region of the wavelength from 1500 to 2500 nm), thus its total solar transmittance (Tts) is insufficient. Furthermore, the infrared rays in the region more than 1500 nm (heat-rays), which make human beings feel sizzling hotness, are not blocked. Therefore, when the infrared shielding sheet of Comparative Example 1 is laid on window glasses of a house or a vehicle, a person therein may feel uncomfortable.

In each infrared shielding sheet of Examples 10 to 15 and Comparative example 2, the surface resistance and the refractive index according to the wavelength of each layer (the high refractive index resin layer and the low refractive index resin layer) of the laminated film were measured as described below.

(Measurement of Surface Resistance of Each Layer)

Each layer was singularly prepared on the PET base material in the same way as preparation of each layer (the high refractive index resin layer and the low refractive index resin layer) of Examples 10 to 15 and Comparative Example 2 so as to obtain each measurement sample. The surface resistance of each prepared layer was measured by the surface resistance meter (trade names "Hiresta® UP" and "Loresta® GP", manufactured by Mitsubishi Chemical Analytech Co., Ltd.).

(Measurement of Refractive Index and Δn of Each Layer)

Each layer was singularly prepared on the PET base material in the same way as preparation of each layer (the high refractive index resin layer and the low refractive index resin layer) of Examples 10 to 15 and Comparative Example 2 so as to obtain each measurement sample. The respective refractive indexes of the prepared layer at the wavelength of 550 nm and of 1000 nm were measured by the spectroscopic ellipsometer (trade name: "M-2000", manufactured by J.A. Woollam (Japan) Co., Inc.) to obtain the value Δn by subtracting the refractive index at the wavelength of 1000 nm from the refractive index at the wavelength of 550 nm.

Example 10

(Preparation of Application Liquid F of Low Refractive Index Resin)

In a solution prepared by solving 0.4 part of KAYARAD® DPHA and 0.05 part of IRGACURE® 184 in 4 parts of MEK, 3 parts of hollow silica fine particles (trade name: "THRULYA® 1110" with the average primary particle size of 50 nm and solid content concentration of 20 wt %, manufactured by JGC Catalysts and Chemicals Ltd., dispersion medium: methyl isobutyl ketone) were dispersed. Thus, an application liquid F of the low refractive index resin for forming a low refractive index resin layer F was prepared.

(Preparation of Laminated Film)

The wavelength of the light reflected by the laminated film was set to 1000 nm. Each layer was laminated, in the order as shown in Table 2 (note that the number of "Layer" in Tables 2 to 7 means the number of the location of the layer when the layers are counted from the far side relative to the PET base material), on the same PET base material as that used for preparation of the laminated film of Example 1, by applying the following liquids, diluted as necessary: the application liquid B of the high refractive index resin prepared in the same way as Example 2; the application liquid A of the low refractive index resin prepared in the same way as Example 1; and the application liquid F of the low refractive index resin prepared as described above, so that each layer has the optical thickness and its coefficient of the QWOT at the wavelength of 1000 nm as indicated in Table 2. Thus, an infrared shielding sheet according to one example of the present invention, having 8 layers as the total of the high refractive index resin layers and the low refractive index resin layers, was prepared. As to each layer, the application liquid was applied by the wire bar coater so as to form the resin layer as indicated in the item "Resin Layer" in Table 2. After it was dried for two minutes at 100° C. for evaporating the solvent, each layer was prepared by the UV irradiation.

Tables 2 to 7 below indicate the following measurement results of each layer: the refractive index at the wavelength of 550 nm (referred to as "refractive index n (550 nm)" in the Tables); the refractive index at the wavelength of 1000 nm (referred to as "refractive index n (1000 nm)" in the Tables); the value Δn obtained by subtracting the refractive index at the wavelength of 1000 nm from the refractive index at the wavelength of 550 nm; and the surface resistance.

TABLE 2

| Layer | Resin Layer | QWOT | Optical Thickness | Refractive Index n (550 nm) Refractive Index n (1000 nm) | Δn | Surface Resistance |
|---|---|---|---|---|---|---|
| 1 | High Refractive Index Resin Layer B | 1.0 | 250 nm | 1.88<br>1.83 | 0.05 | $1 \times 10^{13} \Omega/\square$ |
| 2 | Low Refractive Index Resin Layer F | 1.0 | 250 nm | 1.37<br>1.37 | 0.00 | $1 \times 10^{13} \Omega/\square$ |
| 3 | High Refractive Index Resin Layer B | 1.0 | 250 nm | 1.88<br>1.83 | 0.05 | $1 \times 10^{13} \Omega/\square$ |
| 4 | Low Refractive Index Resin Layer F | 1.0 | 250 nm | 1.37<br>1.37 | 0.00 | $1 \times 10^{13} \Omega/\square$ |
| 5 | High Refractive Index Resin Layer B | 2.0 | 500 nm | 1.88<br>1.83 | 0.05 | $1 \times 10^{13} \Omega/\square$ |
| 6 | Low Refractive Index Resin Layer A | 1.0 | 250 nm | 1.64<br>1.40 | 0.24 | $1 \times 10^{7} \Omega/\square$ |
| 7 | High Refractive Index Resin Layer B | 1.0 | 250 nm | 1.88<br>1.83 | 0.05 | $1 \times 10^{13} \Omega/\square$ |
| 8 | Low Refractive Index Resin Layer A<br>PET Base Material | 2.5 | 625 nm | 1.64<br>1.40 | 0.24 | $1 \times 10^{7} \Omega/\square$ |

Example 11

The wavelength of the light reflected by the laminated film was set to 1000 nm. An infrared shielding sheet according to one example of the present invention, having 8 layers as the total of the high refractive index resin layers and the low refractive index resin layers, was prepared in the same way as Example 10 except that each layer was laminated so that to have the optical thickness and its coefficient of the QWOT at the wavelength of 1000 nm as indicated in Table 3.

TABLE 3

| Layer | Resin Layer | QWOT | Optical Thickness | Refractive Index n (550 nm) Refractive Index n (1000 nm) | Δn | Surface Resistance |
|---|---|---|---|---|---|---|
| 1 | High Refractive Index Resin Layer B | 1.0 | 250 nm | 1.88<br>1.83 | 0.05 | $1 \times 10^{13} \Omega/\square$ |
| 2 | Low Refractive Index Resin Layer F | 1.0 | 250 nm | 1.37<br>1.37 | 0.00 | $1 \times 10^{13} \Omega/\square$ |
| 3 | High Refractive Index Resin Layer B | 1.0 | 250 nm | 1.88<br>1.83 | 0.05 | $1 \times 10^{13} \Omega/\square$ |
| 4 | Low Refractive Index Resin Layer F | 1.0 | 250 nm | 1.37<br>1.37 | 0.00 | $1 \times 10^{13} \Omega/\square$ |
| 5 | High Refractive Index Resin Layer B | 1.5 | 375 nm | 1.88<br>1.83 | 0.05 | $1 \times 10^{13} \Omega/\square$ |
| 6 | Low Refractive Index Resin Layer A | 1.5 | 375 nm | 1.64<br>1.40 | 0.24 | $1 \times 10^{7} \Omega/\square$ |
| 7 | High Refractive Index Resin Layer B | 1.2 | 300 nm | 1.88<br>1.83 | 0.05 | $1 \times 10^{13} \Omega/\square$ |
| 8 | Low Refractive Index Resin Layer A<br>PET Base Material | 2.3 | 575 nm | 1.64<br>1.40 | 0.24 | $1 \times 10^{7} \Omega/\square$ |

12 layers as the total of the high refractive index resin layers and the low refractive index resin layers, was prepared in the same way as Example 10 except that: the total number of the layers obtained by laminating alternately the high refractive index resin layer B using the application liquid B of the high refractive index resin and the low refractive index resin layer F using the application liquid F of the low refractive index resin was changed from 4 to 6; the total number of the layers obtained by laminating alternately the high refractive index resin layer B using the application liquid B of the high refractive index resin and the low refractive index resin layer Example 12

The wavelength of the light reflected by the laminated film was set to 1000 nm. An infrared shielding sheet according to one example of the present invention, having A using the application liquid A of the low refractive index resin was changed from 4 to 6; and each layer was laminated so as to have the optical thickness and its coefficient of the QWOT at the wavelength of 1000 nm as indicated in Table 4.

TABLE 4

| Layer | Resin Layer | QWOT | Optical Thickness | Refractive Index n (550 nm) Refractive Index n (1000 nm) | Δn | Surface Resistance |
|---|---|---|---|---|---|---|
| 1 | High Refractive Index Resin Layer B | 1.0 | 250 nm | 1.88<br>1.83 | 0.05 | $1 \times 10^{13} \Omega/\square$ |
| 2 | Low Refractive Index Resin Layer F | 1.0 | 250 nm | 1.37<br>1.37 | 0.00 | $1 \times 10^{13} \Omega/\square$ |
| 3 | High Refractive Index Resin Layer B | 1.8 | 450 nm | 1.88<br>1.83 | 0.05 | $1 \times 10^{13} \Omega/\square$ |
| 4 | Low Refractive Index Resin Layer F | 1.0 | 250 nm | 1.37<br>1.37 | 0.00 | $1 \times 10^{13} \Omega/\square$ |
| 5 | High Refractive Index Resin Layer B | 1.0 | 250 nm | 1.88<br>1.83 | 0.05 | $1 \times 10^{13} \Omega/\square$ |
| 6 | Low Refractive Index Resin Layer F | 1.0 | 250 nm | 1.37<br>1.37 | 0.00 | $1 \times 10^{13} \Omega/\square$ |
| 7 | High Refractive Index Resin Layer B | 1.0 | 250 nm | 1.88<br>1.83 | 0.05 | $1 \times 10^{13} \Omega/\square$ |
| 8 | Low Refractive Index Resin Layer A | 1.0 | 250 nm | 1.64<br>1.40 | 0.24 | $1 \times 10^{7} \Omega/\square$ |
| 9 | High Refractive Index Resin Layer B | 1.0 | 250 nm | 1.88<br>1.83 | 0.05 | $1 \times 10^{13} \Omega/\square$ |
| 10 | Low Refractive Index Resin Layer A | 1.0 | 250 nm | 1.64<br>1.40 | 0.24 | $1 \times 10^{7} \Omega/\square$ |
| 11 | High Refractive Index Resin Layer B | 1.0 | 250 nm | 1.88<br>1.83 | 0.05 | $1 \times 10^{13} \Omega/\square$ |
| 12 | Low Refractive Index Resin Layer A<br>PET Base Material | 2.2 | 550 nm | 1.64<br>1.40 | 0.24 | $1 \times 10^{7} \Omega/\square$ |

Example 13

(Preparation of Low Refractive Index Resin Layer G)

A dispersion liquid of tin-doped indium oxide fine particles was prepared in the same way as preparation of the application liquid A of the low refractive index resin in the above (Preparation of Low Refractive Index Resin Layer A) of Example 1 except that the amount of the tin-doped indium oxide fine particles was changed to 1.1 parts. In the prepared dispersion liquid of the tin-doped indium oxide fine particles, 1.5 parts of hollow silica fine particles (trade name: "THRULYA® 1110", with the average primary particle size of 50 nm and solid content concentration of 20 wt %, manufactured by JGC Catalysts and Chemicals Ltd., dispersion medium: methyl isobutyl ketone) were dispersed. Thus, an application liquid G of the low refractive index resin for forming a low refractive index resin layer G was prepared.

(Preparation of Laminated Film)

The wavelength of the light reflected by the laminated film was set to 1000 nm. An infrared shielding sheet according to one example of the present invention, having 6 layers as the total of the high refractive index resin layers and the low refractive index resin layers, was prepared in the same way as Example 10 except that each layer was laminated so that: the application liquid used to prepare the layer "4" in Table 2 was changed to the application liquid G of the low refractive index resin; the layers "7" and "8" in Table 2 were removed; and each layer has the optical thickness and its coefficient of the QWOT at the wavelength of 1000 nm as indicated in Table 5. The layer "4" was prepared by: applying the application liquid G of the low refractive index resin by the wire bar coater; then being dried for two minutes at 100° C. for evaporating the solvent; and being subjected to the UV irradiation.

TABLE 5

| Layer | Resin Layer | QWOT | Optical Thickness | Refractive Index n (550 nm) Refractive Index n (1000 nm) | Δn | Surface Resistance |
|---|---|---|---|---|---|---|
| 1 | High Refractive Index Resin Layer B | 1.0 | 250 nm | 1.88<br>1.83 | 0.05 | $1 \times 10^{13} \Omega/\square$ |
| 2 | Low Refractive Index Resin Layer F | 1.0 | 250 nm | 1.37<br>1.37 | 0.00 | $1 \times 10^{13} \Omega/\square$ |
| 3 | High Refractive Index Resin Layer B | 1.0 | 250 nm | 1.88<br>1.83 | 0.05 | $1 \times 10^{13} \Omega/\square$ |
| 4 | Low Refractive Index Resin Layer G | 2.0 | 500 nm | 1.47<br>1.37 | 0.10 | $1 \times 10^{12} \Omega/\square$ |
| 5 | High Refractive Index Resin Layer B | 1.0 | 250 nm | 1.88<br>1.83 | 0.05 | $1 \times 10^{13} \Omega/\square$ |
| 6 | Low Refractive Index Resin Layer A<br>PET Base Material | 2.5 | 625 nm | 1.64<br>1.40 | 0.24 | $1 \times 10^{7} \Omega/\square$ |

Example 14

(Example of Synthesis of Infrared Absorption Pigment)

The infrared absorption coloring matter in the amount of 2.3 parts was obtained in the same way as Example 6.

(Preparation of Infrared Absorption Pigment Layer)

To 7 parts of toluene, the following were added and dispersed: 0.02 part of the above synthesized infrared absorption coloring matter; 1 part of KAYARAD® DPHA; 0.05 part of IRGACURE® 184; and 0.01 part of the aminoalkyl methacrylate copolymer dispersant. The dispersion was performed at the peripheral speed of 10 m/s using the bead mill. Thus, an application liquid containing the infrared absorption coloring matter for forming the infrared absorption coloring matter layer was prepared.

The application liquid containing the infrared absorption coloring matter was applied on the same PET base material as used for preparation of the laminated film of Example 1 by the wire bar coater, so that the application liquid containing the infrared absorption coloring matter had the geometric thickness of 4 µm. After it was dried for two minutes at 100° C. for evaporating the solvent, the infrared absorption coloring matter layer was prepared by the UV irradiation.

(Preparation of Laminated Film)

An infrared shielding sheet according to one example of the present invention was prepared by laminating the laminated film on the above prepared infrared absorption coloring matter layer in the same way as Example 10.

Example 15

(Preparation of Cholesteric Liquid Crystal Film)

The first and second cholesteric liquid crystal layers were prepared, in the same way as Example 7, on the same PET base material as that used for preparation of the laminated film of Example 1.

(Preparation of Laminated Film)

The wavelength of the light reflected by the laminated film was set to 1000 nm. An infrared shielding sheet according to one example of the present invention, having 6 layers as the total of the high refractive index resin layers and the low refractive index resin layers, was prepared in the same way as Example 13 except that: each layer was laminated in the inverse order in the laminated film; and each layer was laminated on the surface of the PET base material opposite to the surface on which the above prepared cholesteric liquid crystal layers are laminated, so that each layer has the optical thickness and its coefficient of the QWOT at the wavelength of 1000 nm as indicated in Table 6.

TABLE 6

| Layer | Resin Layer | QWOT | Optical Thickness | Refractive Index n (550 nm) Refractive Index n (1000 nm) | Δn | Surface Resistance |
|---|---|---|---|---|---|---|
| 1 | Low Refractive Index Resin Layer A | 2.0 | 500 nm | 1.64 1.40 | 0.24 | $1 \times 10^{7} \Omega/\square$ |
| 2 | High Refractive Index Resin Layer B | 1.7 | 425 nm | 1.88 1.83 | 0.05 | $1 \times 10^{13} \Omega/\square$ |
| 3 | Low Refractive Index Resin Layer G | 1.0 | 250 nm | 1.47 1.37 | 0.10 | $1 \times 10^{12} \Omega/\square$ |
| 4 | High Refractive Index Resin Layer B | 1.0 | 250 nm | 1.88 1.83 | 0.05 | $1 \times 10^{13} \Omega/\square$ |
| 5 | Low Refractive Index Resin Layer F | 1.0 | 250 nm | 1.37 1.37 | 0.00 | $1 \times 10^{13} \Omega/\square$ |
| 6 | High Refractive Index Resin Layer B | 1.0 | 250 nm | 1.88 1.83 | 0.05 | $1 \times 10^{13} \Omega/\square$ |
| | Base Material Cholesteric Liquid Crystal Layers | | | | | |

Comparative Example 2

(Preparation of Low Refractive Index Layer)

The application liquid E of the low refractive index resin was prepared in the same way as Comparative Example 1.

(Preparation of Laminated Film)

The wavelength of the light reflected by the laminated film was set to 1000 nm. An infrared shielding sheet as a comparative example, having 8 layers as the total of the high refractive index resin layers and the low refractive index resin layers, was prepared in the same way as Example 10 except that: the application liquids for forming the layers "2", "4", "6" and "8" of Table 2 were changed to the application liquid E of the low refractive index resin; and each layer was laminated so as to have the optical thickness and its coefficient of the QWOT at the wavelength of 1000 nm as indicated in Table 7.

TABLE 7

| Layer | Resin Layer | QWOT | Optical Thickness | Refractive Index n (550 nm) Refractive Index n (1000 nm) | Δn | Surface Resistance |
|---|---|---|---|---|---|---|
| 1 | High Refractive Index Resin Layer B | 1.0 | 250 nm | 1.88 1.83 | 0.05 | $1 \times 10^{13} \Omega/\square$ |

TABLE 7-continued

| Layer | Resin Layer | QWOT | Optical Thickness | Refractive Index n (550 nm) Refractive Index n (1000 nm) | Δn | Surface Resistance |
|---|---|---|---|---|---|---|
| 2 | Low Refractive Index Resin Layer E | 1.0 | 250 nm | 1.46 1.45 | 0.01 | $1 \times 10^{13} \Omega/\square$ |
| 3 | High Refractive Index Resin Layer B | 1.0 | 250 nm | 1.88 1.83 | 0.05 | $1 \times 10^{13} \Omega/\square$ |
| 4 | Low Refractive Index Resin Layer E | 1.0 | 250 nm | 1.46 1.45 | 0.01 | $1 \times 10^{13} \Omega/\square$ |
| 5 | High Refractive Index Resin Layer B | 1.0 | 250 nm | 1.88 1.83 | 0.05 | $1 \times 10^{13} \Omega/\square$ |
| 6 | Low Refractive Index Resin Layer E | 1.0 | 250 nm | 1.46 1.45 | 0.01 | $1 \times 10^{13} \Omega/\square$ |
| 7 | High Refractive Index Resin Layer B | 1.0 | 250 nm | 1.88 1.83 | 0.05 | $1 \times 10^{13} \Omega/\square$ |
| 8 | Low Refractive Index Resin Layer E PET Base Material | 1.0 | 250 nm | 1.46 1.45 | 0.01 | $1 \times 10^{13} \Omega/\square$ |

The visible light transmittance, the haze and the total solar transmittance (Tts) of the respective infrared shielding sheets of Examples 10 to 15 and Comparative Example 2 were measured as follows.

The visible light transmittance, the haze and the total solar transmittance of the respective infrared shielding sheets of Examples 10 to 15 and Comparative Example 2 were measured in the same way as the measurement of the visible light transmittance, the haze and the total solar transmittance (Tts) of the respective infrared shielding sheets of Examples 1 to 9 and Comparative Example 1. The measurement results are shown in the following Table 8.

TABLE 8

| | Visible Light Transmittance | Haze | Tts |
|---|---|---|---|
| Example 10 | 83.20% | 0.2% | 59.50% |
| Example 11 | 84.80% | 0.2% | 61.30% |
| Example 12 | 83.40% | 0.3% | 58.20% |
| Example 13 | 85.60% | 0.2% | 64.40% |
| Example 14 | 70.50% | 0.3% | 48.00% |
| Example 15 | 84.40% | 0.2% | 61.10% |
| Comparative Example 2 | 90.00% | 0.4% | 78.80% |

Figure 4:
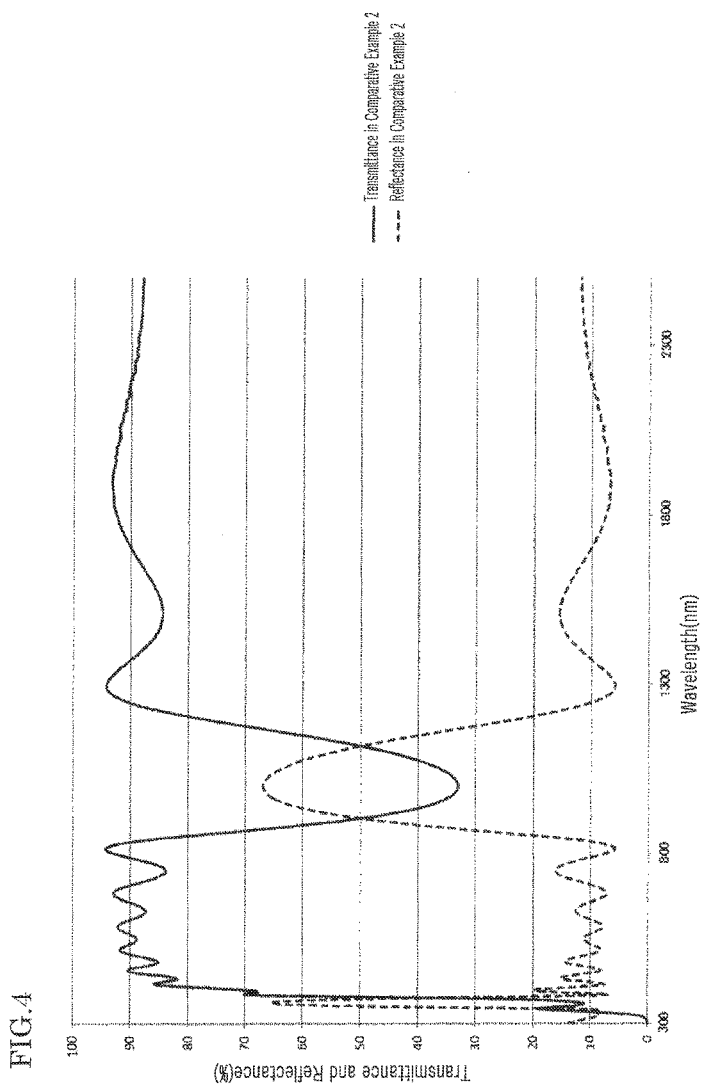
FIG. 4 is a graph showing the refractive index and the reflectance of an infrared shielding sheet according to Comparative Example 2 plotted against wavelength.

It can be seen from FIGS. 3 and 4, and Table 8 that the infrared shielding sheet according to Example 10 of the present invention includes the low refractive index resin layer having the value of 0.1 or more (specifically, 0.24) obtained by subtracting the refractive index at an arbitrary wavelength from 780 to 2500 nm (specifically, at the wavelength of 1000 nm) from the refractive index at the wavelength of 550 nm. Thus, compared with the infrared shielding sheet of Comparative Example 2 all of whose low refractive index resin layers have the value less than 0.1 (specifically, 0.01) obtained by subtracting the refractive index at an arbitrary wavelength from 780 to 2500 nm (specifically, at the wavelength of 1000 nm) from the refractive index at the wavelength of 550 nm, the infrared shielding sheet according to Example 10 of the present invention effectively reflects the infrared rays in the wavelength region from 780 to 1500 nm while absorbing the infrared rays in the wavelength region from 1500 to 2500 nm. Thus, the total solar transmittance (Tts) is remarkably improved. Furthermore, it can be seen from the comparison of FIG. 1 with FIG. 3 that the infrared shielding sheet according to Example 10 of the present invention includes the layer having the coefficient of the QWOT of 1.5 or more (2.0 or 2.5) related to the optical thickness at an arbitrary wavelength from 780 to 2500 nm (specifically, at the wavelength of 1000 nm). Thus, compared with the infrared shielding sheet of Example 1 all of whose layers have the coefficient of the QWOT less than 1.5 related to the optical thickness at an arbitrary wavelength from 780 to 2500 nm (specifically, at the wavelength of 1000 nm), the infrared shielding sheet according to Example 10 of the present invention effectively blocks the infrared rays in the wavelength region from 780 to 1500 nm.

In the infrared shielding sheets of Examples 14 and 15, the laminated film used in the infrared shielding sheet of Example 1 was combined, respectively, with the infrared absorption coloring matter or the cholesteric liquid crystal film. This enables these infrared shielding sheets to further effectively block the infrared rays, while maintaining the visible light transmittance (i.e., the total solar transmittance is improved).

As shown in FIG. 4, in the infrared shielding sheet of Comparative Example 2, the fine particles do not absorb the infrared rays (in the wavelength region from 1500 to 2500 nm), thus its total solar transmittance (Tts) is insufficient. Furthermore, the infrared rays in the wavelength region more than 1500 nm (heat-rays), which make human beings feel sizzling hotness, are not blocked. Therefore, when the infrared shielding sheet of Comparative Example 2 is laid on window glasses of a house or a vehicle, a person therein may feel uncomfortable.

Example 16

(Preparation of Interlayer Film for Laminated Glass)

A PVB film as the first interlayer film was overlapped with the prepared infrared shielding sheet of Example 10, thus a laminated body was obtained. The obtained laminated body was sandwiched and pressed at the position of 1 mm or less from the outer periphery (four sides) of the infrared shielding sheet by two heat laminating rollers respectively disposed on the side of the front surface and the side of the rear surface of the laminated body. Thus, the infrared shielding sheet and the first interlayer film were thermocompressively bonded. When bonding, the temperature of the heat laminating roller on the side of the interlayer film was set to 25° C. so as to not crush the emboss of the rear surface of the first interlayer film, while the temperature of the heat laminating roller on the side of the transparent support (PET base material) was set to 120° C. so as to sufficiently crush the emboss of the surface of the first interlayer film on the side of the infrared shielding sheet to improve the adhesiveness between the first interlayer film and the infrared shielding sheet. After that, on the surface of the infrared shielding sheet opposite to the surface on which was bonded the first interlayer film, a PVD film as the second interlayer film was laminated, thus, the interlayer film for laminated glass including the infrared shielding sheet of Example 10 was prepared. Also, five kinds of interlayer films for laminated glass including respectively the infrared shielding sheets of Examples 11 to 15 were prepared in the same way as preparation of the above interlayer film for laminated glass except that the respective infrared shielding sheets of Examples 11 to 15 were used in place of the infrared shielding sheet of Example 10.

(Finish of Laminated Glass)

The interlayer film for laminated glass including the above prepared infrared shielding sheet of Example 10 was laminated so that the lamination was performed in the following order: the glass plate; the first interlayer film; the infrared shielding sheet; the second interlayer film; and the glass plate. Thus, the laminated body was prepared, which has the structure that the two glass plates sandwich and hold the interlayer film for laminated glass therebetween (i.e., the interlayer film for laminated glass were interposed between the two glass plates). Here, the respective end edges of the two glass plates and the respective end edges of the first and second interlayer films were all located at the same position. The glass plates having the thickness of 2 mm were used. The obtained laminated body having the configuration in which the interlayer film for laminated glass was interposed between the two glass plates was compressively bonded preliminarily at 95° C. for 30 minutes in the vacuum environment. After preliminary compression bonding, the laminated body interposed between the two glass plates was thermocompressively bonded in an autoclave under the pressure of 1.3 MPa at 120° C., thus the laminated glass was prepared. Also, five kinds of laminated glasses including respectively the infrared shielding sheets of Examples 11 to 15 were prepared in the same way as preparation of the above laminated glass except that the respective interlayer films for laminated glass including the respective infrared shielding sheets of Examples 11 to 15 were used in place of the interlayer film for laminated glass including the infrared shielding sheet of Example 10.

The properties of the laminated glasses including the respective infrared shielding sheets of Examples 10 to 15, all prepared in Example 16, were evaluated. It was confirmed that the laminated glasses including the respective infrared shielding sheets of Examples 10 to 15 have a good quality without remarkable defects or cords, and serve as a transparent heat shielding glass having the haze of 0.5% or less.

INDUSTRIAL APPLICABILITY

According to the present invention, the infrared reflecting function using the difference in the refractive index is given to the infrared shielding sheet in addition to the infrared absorbing function of the fine particles. Thus, compared with the conventional infrared shielding sheet, it is found that the infrared shielding sheet of the present invention suppresses the increase of the temperature caused by the infrared rays. Thus, when the infrared shielding sheet of the present invention is laid on window glasses of a house or a vehicle, it is possible to suppress the increase of the space temperature inside the house or the vehicle and reduce the load of air conditioning equipment of the house or the vehicle, which results in energy saving and contribution to global environment issues. Furthermore, the infrared shielding sheet of the present invention can selectively block the light in the infrared region, thus it can be used to a window member of a building or a vehicle, a window glass for a refrigeration/cold showcase, an IR-cut filter, counterfeit prevention and the like.

REFERENCE SIGNS LIST

1 Interlayer film for laminated glass
2 Infrared shielding sheet (may including transparent support)
3, 3' Interlayer film
4 Laminated glass
5, 5' Glass plate
20 Transparent support
21 High refractive index resin layer
22 Low refractive index resin layer
23 Laminated film The present invention may be embodied in other forms without departing from the gist or essential characteristics thereof. The foregoing examples are therefore to be considered in all respects as illustrative and not limiting. The scope of the present invention is indicated by the appended claims rather than by the foregoing description, and all modifications and changes that come within the meaning and range of equivalency of the claims are intended to be embraced therein.

This application claims priority to Japanese Patent Applications No. 2013-104324 filed in Japan on May 16, 2013 and No. 2013-272893 filed in Japan on Dec. 27, 2013, the entire contents of which are hereby incorporated herein by reference.

The invention claimed is:

1. An infrared shielding sheet comprising a laminated film formed by alternately laminating at least one high refractive index resin layer containing fine particles and at least one low refractive index resin layer containing fine particles,
   wherein at least one of the at least one low refractive index resin layer contains the fine particles in an amount of from 40 to 95 wt. %, and has a value of 0.1 or more that is obtained by subtracting a refractive index at an arbitrary wavelength from 780 to 2500 nm from a refractive index at a wavelength of 550 nm, and
   the at least one low refractive index resin layer has a refractive index lower than a refractive index of the at least one high refractive index resin layer at any wavelength in a range from 550 nm to the arbitrary wavelength inclusive.

2. The infrared shielding sheet according to claim 1,
   wherein the at least one low refractive index resin layer has a refractive index lower than a refractive index of the at least one high refractive index resin layer at an arbitrary wavelength from 780 to 2500 nm, and
   at least one of the at least one high refractive index resin layer and/or at least one of the at least one low refractive index resin layer have/has a coefficient of QWOT of 1.5 or more related to an optical thickness in an arbitrary wavelength from 780 to 2500 nm.

3. The infrared shielding sheet according to claim 1,
   wherein each of the at least one high refractive index resin layer and the at least one low refractive index resin layer has a surface resistance of 1 k$\Omega$/□ or more, and a total number of the at least one high refractive index resin layer and the at least one low refractive index resin layer is 4 or more.

4. The infrared shielding sheet according to claim 1, having a visible light transmittance of 50% or more and a haze of 8% or less.

5. The infrared shielding sheet according to claim 1, wherein at least one of the at least one high refractive index resin layer contains at least one kind of fine particles selected from a group consisting of titanium oxide, zirconium oxide, hafnium oxide, tantalum oxide, tungsten oxide, niobium oxide, cerium oxide, lead oxide, zinc oxide, diamond, boride, and nitride.

6. The infrared shielding sheet according to claim 1, wherein a content of the fine particles in the at least one high refractive index resin layer is 95 wt. % or less based on a total of the at least one high refractive index resin layer.

7. The infrared shielding sheet according to claim 1, wherein a content of the fine particles in the at least one low refractive index resin layer is 95 wt. % or less based on a total of the at least one low refractive index resin layer.

8. The infrared shielding sheet according to claim 1, further comprising at least one selected from a group consisting of a cholesteric liquid crystal film, a birefringence multilayer film, and infrared absorption coloring matter.

9. The infrared shielding sheet according to claim 1, further comprising a transparent support,
wherein the laminated film is formed on the transparent support.

10. A method for manufacturing the infrared shielding sheet according to claim 1, comprising a step of forming the at least one high refractive index resin layer and the at least one low refractive index resin layer by application method.

11. The infrared shielding sheet according to claim 1, wherein the at least one high refractive index resin layer has a value of 0.1 or less that is obtained by subtracting a refractive index at an arbitrary wavelength from 780 to 1500 nm from a refractive index at the wavelength of 550 nm, and
the at least one low refractive index resin layer has a value of 0.1 or more that is obtained by subtracting a refractive index at an arbitrary wavelength from 780 to 1500 nm from the refractive index at the wavelength of 550 nm.

12. The infrared shielding sheet according to claim 11, wherein each of the at least one high refractive index resin layer and the at least one low refractive index resin layer has a surface resistance of 1 kΩ/□ or more,
a total number of the at least one high refractive index resin layer and the at least one low refractive index resin layer is 3 or more, and
each of the at least one high refractive index resin layer and the at least one low refractive index resin layer at an arbitrary wavelength from 780 to 1500 nm has a optical thickness in a range from 195 to 375 nm.

13. The infrared shielding sheet according to claim 1, wherein at least one of the at least one low refractive index resin layer contains at least one kind of fine particles selected from a group consisting of tin oxide, indium oxide, zinc oxide, and tungsten oxide.

14. The infrared shielding sheet according to claim 13, wherein at least one of the at least one low refractive index resin layer contains at least one kind of fine particles selected from a group consisting of antimony-doped tin oxide, tin-doped indium oxide, gallium-doped zinc oxide, oxygen-deficient tungsten oxide, and cesium-doped tungsten oxide.

15. The infrared shielding sheet according to claim 13,
wherein at least one of the at least one low refractive index resin layer contains at least one kind of non-hollow fine particles selected from the group, and
at least one of the at least one low refractive index resin layer includes hollow fine particles.

16. The infrared shielding sheet according to claim 13, wherein at least one of the at least one low refractive index resin layer contains silica fine particles.

17. The infrared shielding sheet according to claim 16, wherein the silica fine particles are hollow silica fine particles.

18. An interlayer film for laminated glass comprising:
the infrared shielding sheet according to claim 1; and
an interlayer film that is formed on at least one of outermost layers of the infrared shielding sheet.

19. The interlayer film for laminated glass according to claim 18, wherein the interlayer film contains polyvinyl butyral.

20. A laminated glass comprising:
the interlayer film for laminated glass according to claim 18; and
a plurality of glass plates,
wherein the interlayer film for laminated glass is interposed between the plurality of glass plates.

21. A window member comprising the laminated glass according to claim 20.

* * * * *